United States Patent
Sugiyama

(10) Patent No.: US 10,983,425 B2
(45) Date of Patent: Apr. 20, 2021

(54) PROJECTOR

(71) Applicant: SEIKO EPSON CORPORATION, Tokyo (JP)

(72) Inventor: Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/797,001

(22) Filed: Feb. 21, 2020

(65) Prior Publication Data

US 2020/0272038 A1    Aug. 27, 2020

(30) Foreign Application Priority Data

Feb. 22, 2019    (JP) ............................. JP2019-030230

(51) Int. Cl.
  *G03B 21/16*    (2006.01)
  *F28D 15/02*    (2006.01)
  *H04N 9/31*    (2006.01)

(52) U.S. Cl.
  CPC ............. *G03B 21/16* (2013.01); *F28D 15/02* (2013.01); *H04N 9/3144* (2013.01)

(58) Field of Classification Search
  CPC ...... G03B 21/00–64; H04N 9/31–3197; F28D 15/00–06
  See application file for complete search history.

(56) References Cited

U.S. PATENT DOCUMENTS

| 8,517,540 B2 | 8/2013 | Terao |
| 2002/0191159 A1 | 12/2002 | Nagao et al. |
| 2010/0118279 A1* | 5/2010 | Itsuki ................... H04N 9/3167 353/54 |
| 2010/0132379 A1 | 6/2010 | Wu et al. |
| 2011/0037954 A1* | 2/2011 | Tsuchiya ................ G03B 21/16 353/54 |
| 2011/0242499 A1 | 10/2011 | Terao |
| 2016/0147034 A1* | 5/2016 | Shoujiguchi ........... G02B 7/028 359/512 |

(Continued)

FOREIGN PATENT DOCUMENTS

| JP | 2002-107698 A | 4/2002 |
| JP | 2002-372748 A | 12/2002 |

(Continued)

*Primary Examiner* — Christina A Riddle
(74) *Attorney, Agent, or Firm* — Dority & Manning, P.A.

(57) ABSTRACT

A projector includes a cooler cooling a cooling target based on transformation of refrigerant into gas. A refrigerant generator of the cooler includes a moisture absorbing and releasing member, a first blower, a heat exchanger, a heater, a second blower, a first circulation duct through which the air sent to the moisture absorbing and releasing member from the heat exchanger passes, and a second circulation duct through which the air sent to the heat exchanger from the moisture absorbing and releasing member passes. The second circulation duct includes a second opening disposed in a position where the second opening and a first opening of the first circulation duct sandwich the moisture absorbing and releasing member in a predetermined direction. An opening area of the second opening is smaller than an opening area of the first opening. When viewed along the predetermined direction, the entire second opening overlaps the first opening.

9 Claims, 11 Drawing Sheets

(56) References Cited

U.S. PATENT DOCUMENTS

2016/0196311 A1    7/2016  Wang et al.

FOREIGN PATENT DOCUMENTS

| | | |
|---|---|---|
| JP | 2005-211743 A | 8/2005 |
| JP | 2007-294655 A | 11/2007 |
| JP | 2009-222998 A | 10/2009 |
| JP | 2010-107751 A | 5/2010 |
| JP | 2011-036768 A | 2/2011 |
| JP | 2011-215457 A | 10/2011 |
| JP | 2014-087797 A | 5/2014 |
| JP | 2019-117332 A | 7/2019 |
| WO | 2009/116194 A1 | 9/2009 |

* cited by examiner

PROJECTOR

The present application is based on, and claims priority from JP Application Serial Number 2019-030230, filed Feb. 22, 2019, the disclosure of which is hereby incorporated by reference herein in its entirety.

BACKGROUND

1. Technical Field

The present disclosure relates to a projector.

2. Related Art

As means for cooling a projector, there have been proposed cooling means by air cooling using a blower described in, for example, JP A-2002-107698 (Patent Literature 1), cooling means by liquid cooling using a pump for feeding refrigerant liquid and a pipe for allowing the refrigerant liquid to pass described in, for example, JP A-2007-294655 (Patent Literature 2), and the like.

In recent years, according to, for example, an increase in luminance of a projector, a heat quantity of a cooling target cooled by cooling means has been increasing and improvement of cooling performance by the cooling means has been requested. However, cooling performance is improved in the cooling means by the air cooling, the liquid cooling, and the like described above, the cooling means is increased in size and the projector is increased in size. In the case of the air cooling, noise due to the blower also increases.

SUMMARY

A projector according to an aspect of the present disclosure is a projector including a cooling target, the projector including: a light source device configured to emit light; a light modulator configured to modulate, according to an image signal, the light emitted from the light source device; a projection optical device configured to project the light modulated by the light modulator; and a cooler configured to cool the cooling target based on transformation of a refrigerant into gas. The cooler includes: a refrigerant generator configured to generate the refrigerant; and a refrigerant sender configured to transfer the generated refrigerant to the cooling target. The refrigerant generator includes: a rotating moisture absorbing and releasing member; a first blower configured to send air to a portion of the moisture absorbing and releasing member located in a first region; a heat exchanger coupled to the refrigerant sender; a heater configured to heat a portion of the moisture absorbing and releasing member located in a second region different from the first region; a circulation path passing the portion of the moisture absorbing and releasing member located in the second region and the heat exchanger; a second blower configured to circulate the air in the circulation path and send the air around the portion of the moisture absorbing and releasing member heated by the heater to an inside of the heat exchanger; a first circulation duct through which the air sent to the moisture absorbing and releasing member from the inside of the heat exchanger by the second blower passes; and a second circulation duct through which the air sent to the inside of the heat exchanger from the moisture absorbing and releasing member by the second blower passes. The heat exchanger is cooled to generate the refrigerant from the air flowing into the heat exchanger. The first circulation duct includes a first opening opposed to the portion of the moisture absorbing and releasing member located in the second region. The second circulation duct includes a second opening opposed to the portion of the moisture absorbing and releasing member located in the second region, the second opening being disposed in a position where the second opening and the first opening sandwich the moisture absorbing and releasing member in a predetermined direction. An opening area of the second opening is smaller than an opening area of the first opening. When viewed along the predetermined direction, the entire second opening overlaps the first opening.

When viewed along the predetermined direction, the entire second opening may be disposed to be separated further to an inner side than an inner edge of the first opening.

When viewed along the predetermined direction, a part of an inner edge of the second opening may overlap a part of an inner edge of the first opening.

The second circulation duct may include a wall portion opposed to the moisture absorbing and releasing member, the second opening may be a through-hole provided in the wall portion, and, when viewed along the predetermined direction, at least a part of a peripheral edge portion of the second opening in the wall portion may overlap the first opening.

The predetermined direction may be substantially parallel to an axial direction of a rotation axis of the moisture absorbing and releasing member.

When viewed along the predetermined direction, the first opening and the second opening may have fan shapes centering on the rotation axis of the moisture absorbing and releasing member.

When viewed along the predetermined direction, the entire first opening and the entire second opening may overlap the moisture absorbing and releasing member.

The heater may include: a heat sink disposed on an inside of the first circulation duct; a heater body configured to heat the heat sink; and the second blower.

The cooling target may be the light modulator.

DESCRIPTION OF EXEMPLARY EMBODIMENTS

Figure 1:
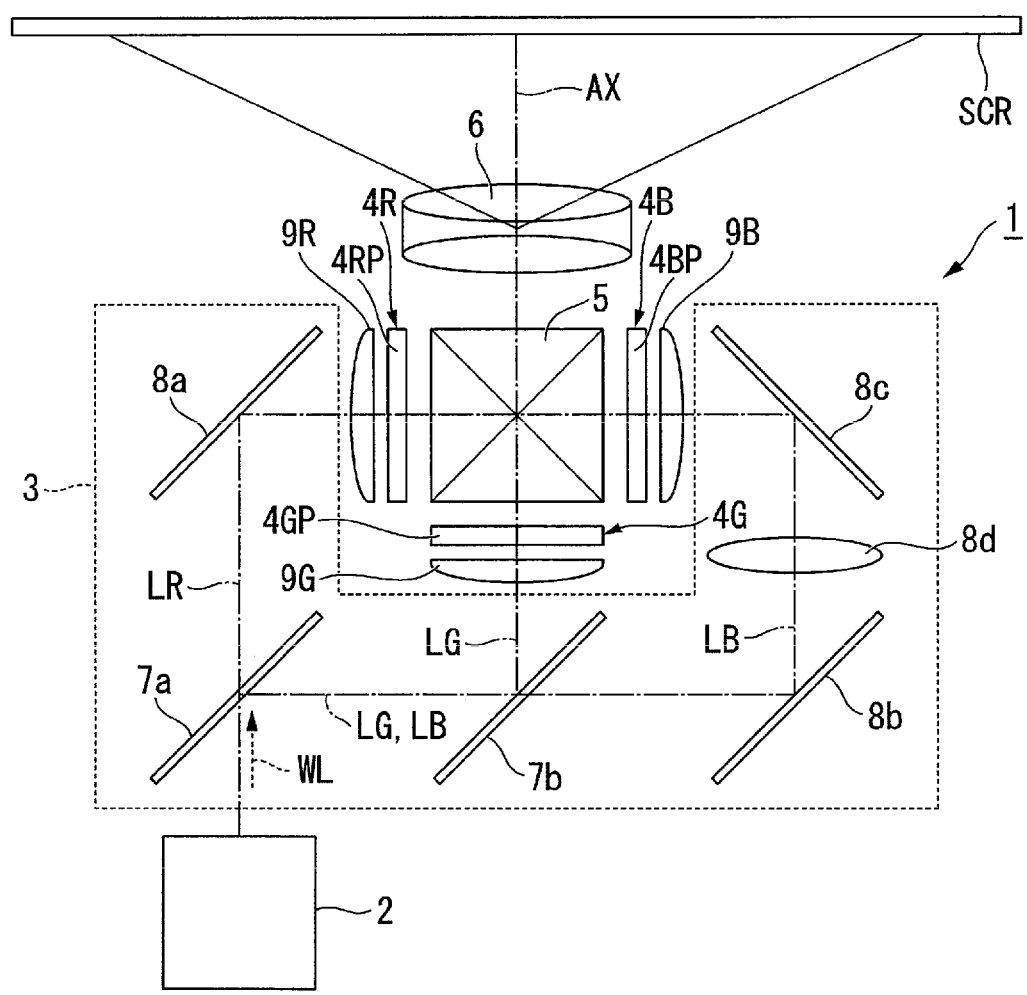
FIG. 1 is a schematic configuration diagram showing a projector in an embodiment.

A projector according to an embodiment of the present disclosure is explained below with reference to the drawings. The scope of the present disclosure is not limited to the embodiment explained below and can be optionally changed within the scope of the technical idea of the present disclosure. In the drawings referred to below, scales, numbers, and the like in structures are sometimes differentiated from scales, numbers, and the like in actual structures in order to facilitate understanding of components.

Figure 2:
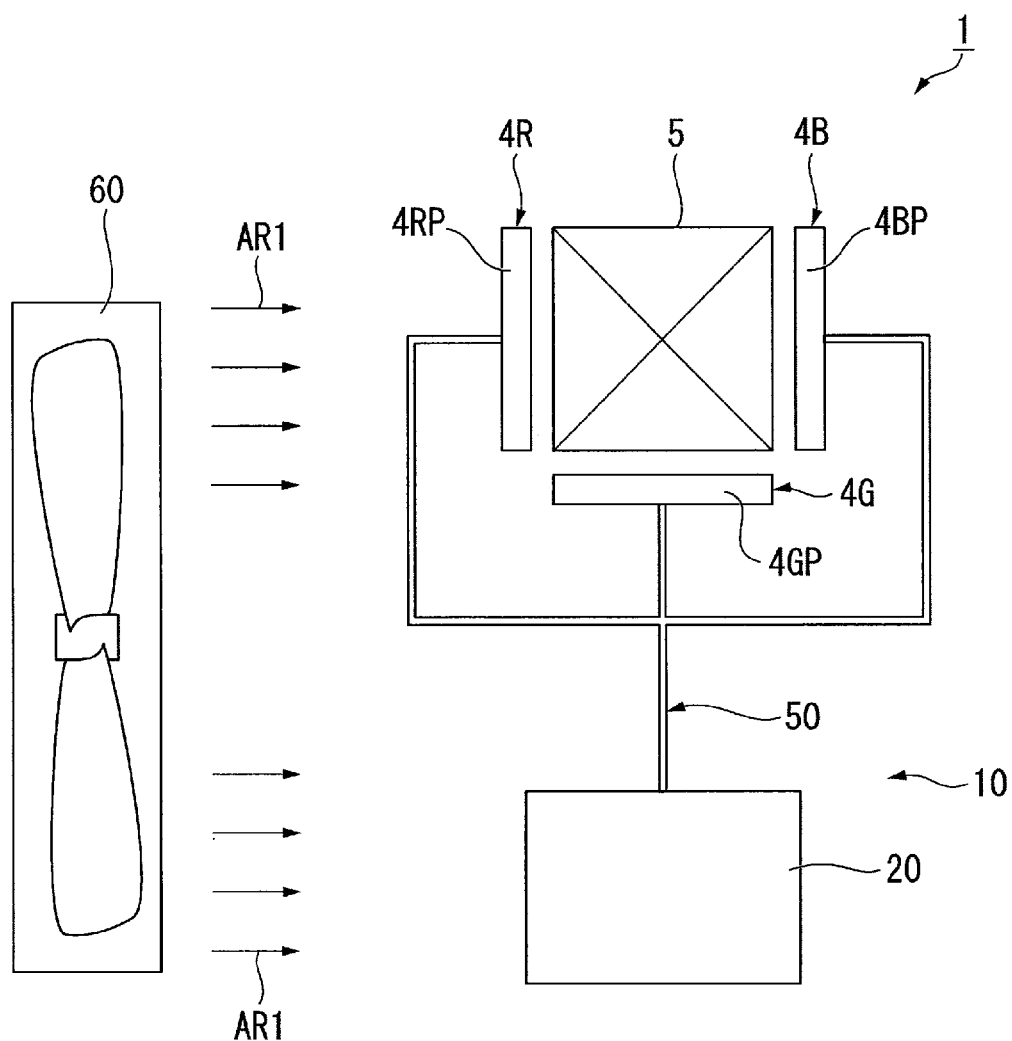
FIG. 2 is a schematic diagram showing a part of the projector in the embodiment.

FIG. 1 is a schematic configuration diagram showing a projector 1 in this embodiment. FIG. 2 is a schematic diagram showing apart of the projector 1 in this embodiment. As shown in FIG. 1, the projector 1 includes a light source device 2, a color separation optical system 3, a light modulating unit 4R, a light modulating unit 4G, a light modulating unit 4B, a light combination optical system 5, and a projection optical device 6. The light modulating unit 4R includes a light modulator 4RP. The light modulating unit 4G includes a light modulator 4GP. The light modulating unit 4B includes a light modulator 4BP.

The light source device 2 emits illumination light WL adjusted to have a substantially uniform illuminance distribution toward the color separation optical system 3. The light source device 2 includes, for example, a semiconductor laser as a light source. The color separation optical system 3 separates the illumination light WL emitted from the light source device 2 into red light LR, green light LG, and blue light LB. The color separation optical system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL emitted from the light source device 2 into the red light LR and light obtained by mixing the green light LG and the blue light LB. The first dichroic mirror 7a has a characteristic of transmitting the red light LR and reflecting the green light LG and the blue light LB. The second dichroic mirror 7b separates the light obtained by mixing the green light LG and the blue light LB into the green light LG and the blue light LB. The second dichroic mirror 7b has a characteristic of reflecting the green light LG and transmitting the blue light LB.

The first reflection mirror 8a is disposed in an optical path of the red light LR and reflects the red light LR transmitted through the first dichroic mirror 7a toward the light modulator 4RP. The second reflection mirror 8b and the third reflection mirror 8c are disposed in an optical path of the blue light LB and guide the blue light LB transmitted through the second dichroic mirror 7b to the light modulator 4BP.

Each of the light modulator 4RP, the light modulator 4GP, and the light modulator 4BP is configured from a liquid crystal panel. The light modulator 4RP modulates, according to an image signal, the red light LR in the light emitted from the light source device 2. The light modulator 4GP modulates, according to an image signal, the green light LG in the light emitted from the light source device 2. The light modulator 4BP modulates, according to an image signal, the blue light LB in the light emitted from the light source device 2. Consequently, the light modulators 4RP, 4GP, and 4BP form image lights corresponding to the color lights.

Although not illustrated, polarizing plates are disposed on a light incident side and a light emission side of each of the light modulators 4RP, 4GP, and 4BP.

On the light incident side of the light modulator 4RP, a field lens 9R for collimating the red light LR made incident on the light modulator 4RP is disposed. On the light incident side of the light modulator 4GP, a field lens 9G for collimating the green light LG made incident on the light modulator 4GP is disposed. On the light incident side of the light modulator 4BP, a field lens 9B for collimating the blue light LB made incident on the light modulator 4BP is disposed.

The light combination optical system 5 is configured from a cross dichroic prism having a substantially cubic shape. The light combination optical system 5 combines the image lights of the colors emitted from the light modulators 4RP, 4GP, and 4BP. The light combination optical system 5 emits the combined image light toward the projection optical device 6. The projection optical device 6 is configured from a projection lens group. The projection optical device 6 projects the image light combined by the light combination optical system 5, that is, the light modulated by the light modulators 4RP, 4GP, and 4BP toward a screen SCR while enlarging the image light. Consequently, an enlarged color image (video) is displayed on the screen SCR.

As shown in FIG. 2, the projector 1 further includes a cooler 10. The cooler 10 cools cooling targets included in the projector 1 based on transformation of a refrigerant W into gas. In this embodiment, the refrigerant W is, for example, liquid water. Accordingly, in the following explanation, the refrigerant W changing to gas is sometimes simply referred to as vaporization. In this embodiment, the cooling targets include the light modulating units 4R, 4G, and 4B. That is, in this embodiment, the cooling targets include the light modulators 4RP, 4GP, and 4BP.

The cooler 10 includes a refrigerant generator 20 and a refrigerant sender 50. The refrigerant generator 20 is a portion that generates the refrigerant W. The refrigerant sender 50 is a portion that transfers the generated refrigerant W to the cooling targets. The refrigerant W fed to the cooling targets, that is, in this embodiment, the light modulating units 4R, 4G, and 4B by the refrigerant sender 50 can take heat from the cooling targets by vaporizing. The cooler 10 can cool the cooling targets. The sections are explained in detail below.

Figure 3:
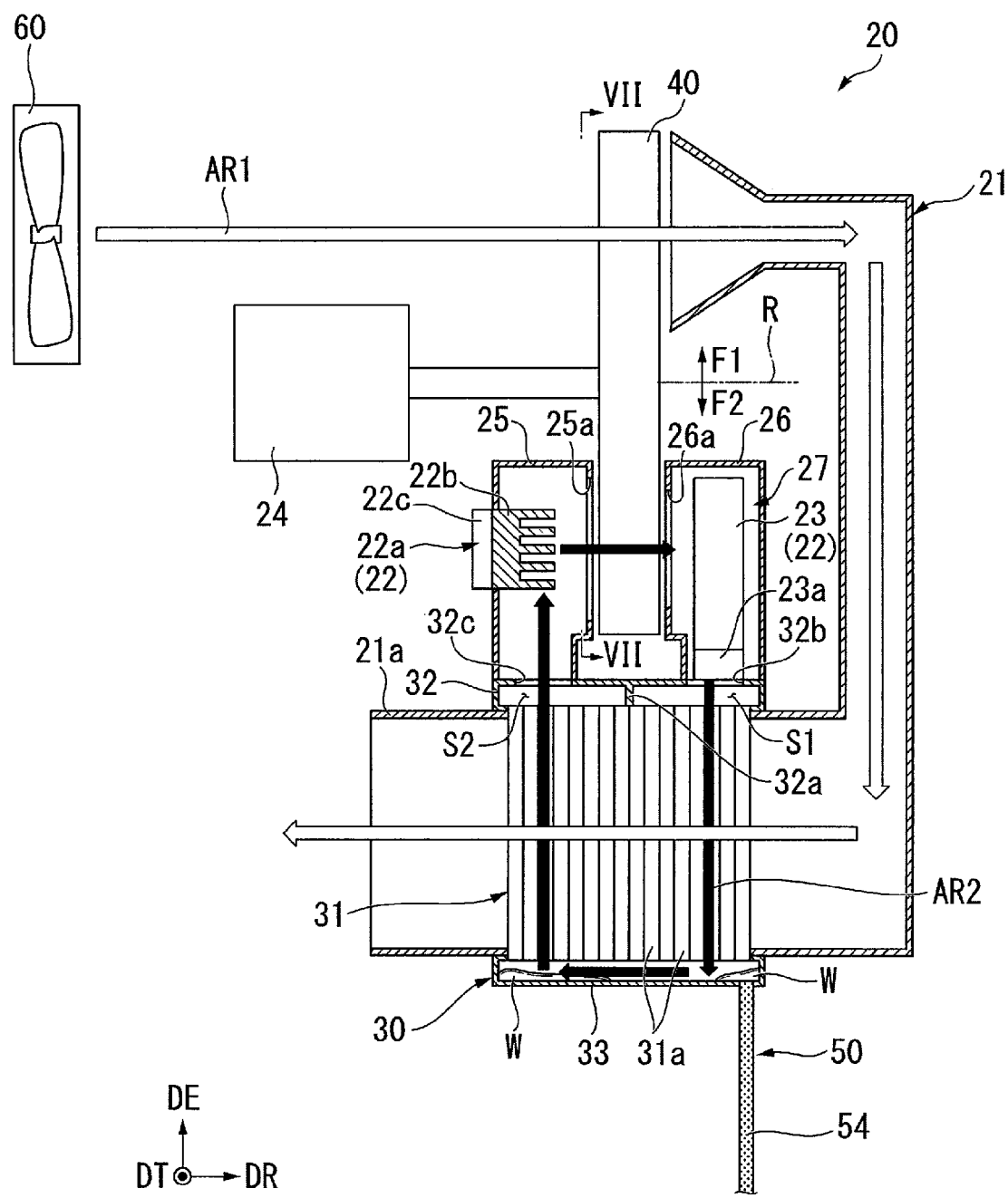
FIG. 3 is a schematic configuration diagram schematically showing a refrigerant generator in the embodiment.
Figure 4:
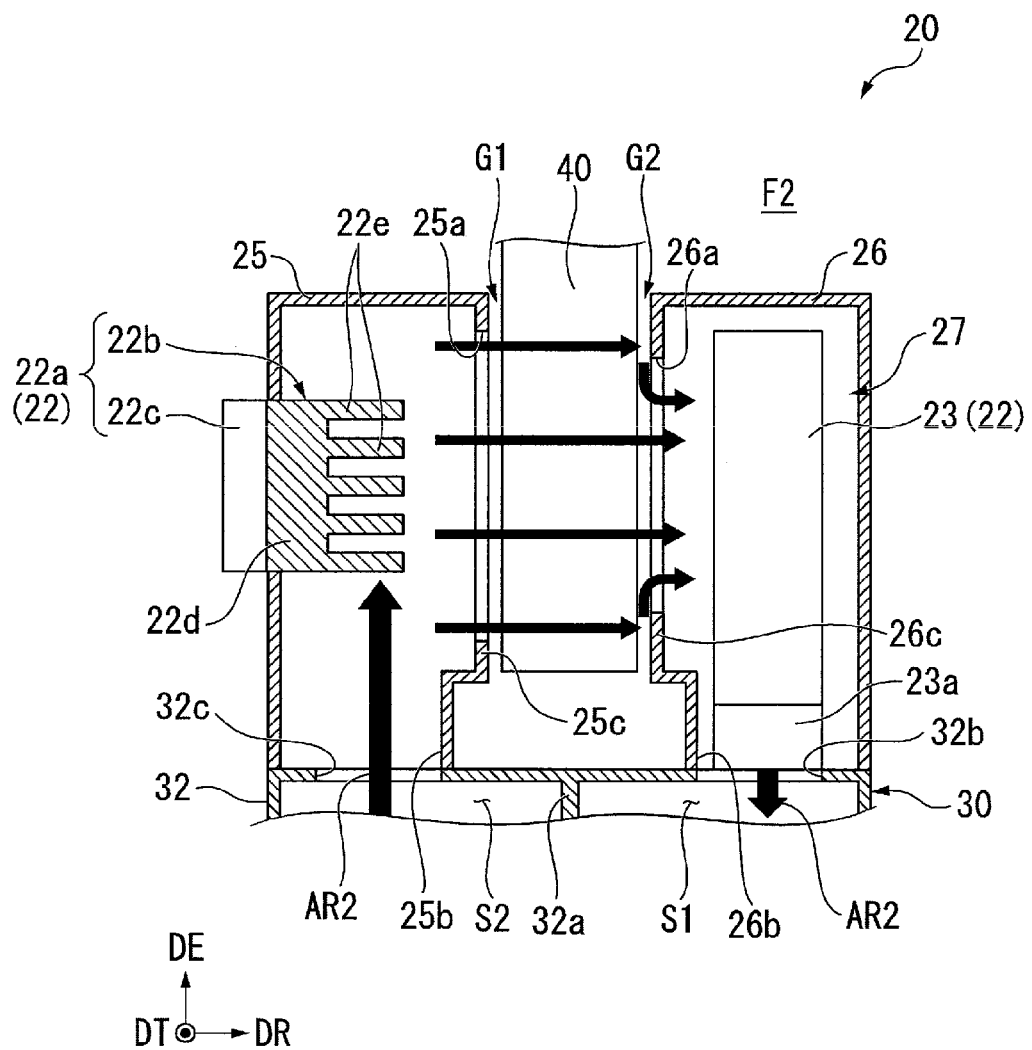
FIG. 4 is a diagram showing apart of the refrigerant generator in this embodiment and is a partially enlarged view in FIG. 3.

FIG. 3 is a schematic configuration diagram schematically showing the refrigerant generator 20 in this embodiment. FIG. 4 is a diagram showing a part of the refrigerant generator 20 in this embodiment and is a partially enlarged view in FIG. 3. The refrigerant generator 20 includes, as shown in FIGS. 3 and 4, a moisture absorbing and releasing member 40, a motor 24, a first blower 60, a heat exchanger 30, a first circulation duct 25, a second circulation duct 26, a heater 22, a second blower 23, and a cooling duct 21.

Figure 5:
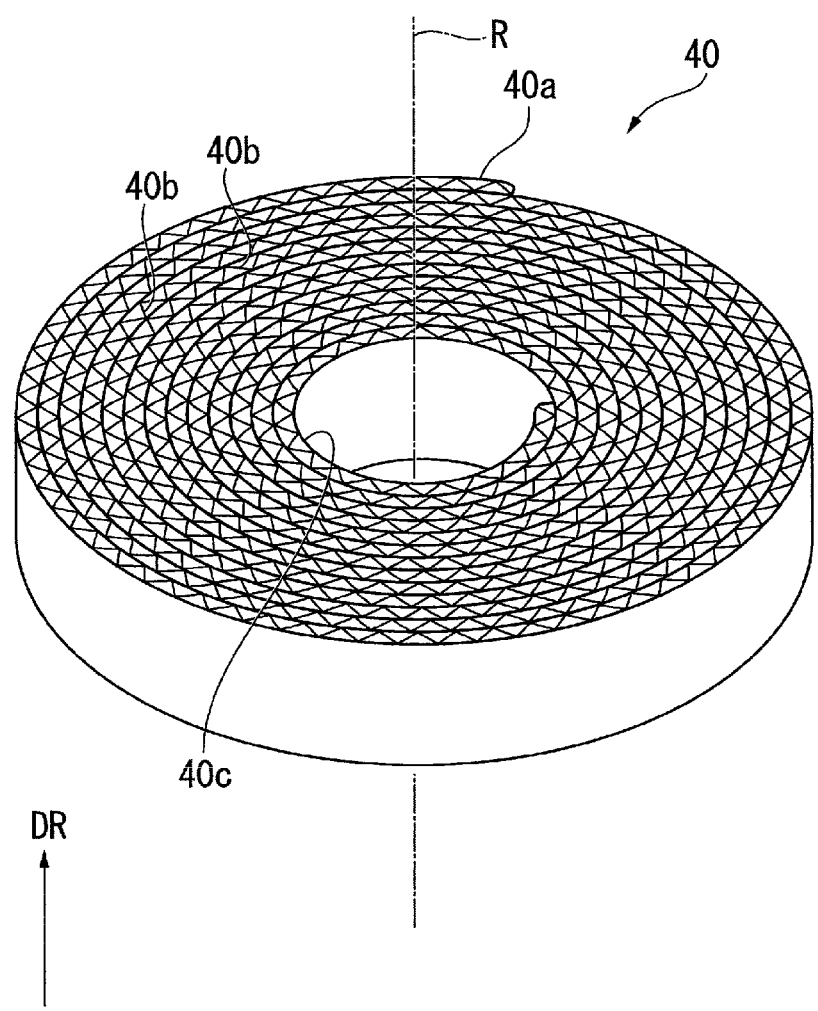
FIG. 5 is a perspective view showing a moisture absorbing and releasing member in the embodiment.

FIG. 5 is a perspective view showing the moisture absorbing and releasing member 40. As shown in FIG. 5, the moisture absorbing and releasing member 40 has a flat columnar shape centering on a rotation axis R. A center hole 40c centering on the rotation axis R is formed in the center of the moisture absorbing and releasing member 40. The center hole 40c pierces through the moisture absorbing and releasing member 40 in the axial direction of the rotation axis R. The moisture absorbing and releasing member 40 rotates around the rotation axis R. In the following explanation, the axial direction of the rotation axis R is referred to as "rotation axis direction DR" and indicated by a DR axis in the figures as appropriate.

The moisture absorbing and releasing member 40 includes innumerable through-holes 40b piercing through the moisture absorbing and releasing member 40 in the rotation axis direction DR. The moisture absorbing and releasing member 40 is a porous member. The moisture absorbing and releasing member 40 has moisture absorbing and releasing properties. In this embodiment, the moisture absorbing and releasing member 40 is manufactured by, for example, winding a belt-like member 40a including through-holes 40b around the rotation axis R and applying a substance having moisture absorbing and releasing properties on a surface exposed to the outside in the wound belt-like member 40a. The surface exposed to the outside in the wound belt-like member 40a includes the outer surface of the moisture absorbing and releasing member 40, the inner circumferential surface of the center hole 40c, and the inner side surfaces of the through-holes 40b. The entire moisture absorbing and releasing member 40 may be made of the substance having the moisture absorbing and releasing properties. Examples of the substance having the moisture absorbing and releasing properties include zeolite and silica gel.

An output shaft of the motor 24 shown in FIG. 3 is inserted into the center hole 40c of the moisture absorbing and releasing member 40 and fixed. The motor 24 rotates the moisture absorbing and releasing member 40 around the rotation axis R. Rotating speed of the moisture absorbing and releasing member 40 rotated by the motor 24 is, for example, approximately 0.2 rpm or more and 5 rpm or less.

The first blower 60 is, for example, an intake fan that takes the air on the outside into the projector 1. The first blower 60 sends air AR1 to a portion of the moisture absorbing and releasing member 40 located in a first region F1. The first region F1 is a region further on one side than the rotation axis R in a direction orthogonal to the rotation axis R. On the other hand, a region further on the other side than the rotation axis R in the direction orthogonal to the rotation axis R, that is, a region on the opposite side of the first region F1 with respect to the rotation axis R is a second region F2. The first region F1 is a region further on the upper side than the rotation axis R in FIG. 3. The second region F2 is a region further on the lower side than the rotation axis R in FIG. 3.

As shown in FIG. 2, the first blower 60 sends the air AR1 to the light modulating units 4R, 4G, and 4B, which are the cooling targets, as well. The first blower 60 is not particularly limited if the first blower 60 can send the air AR1. The first blower 60 may be, for example, an axial fan or may be a centrifugal fan.

Figure 6:
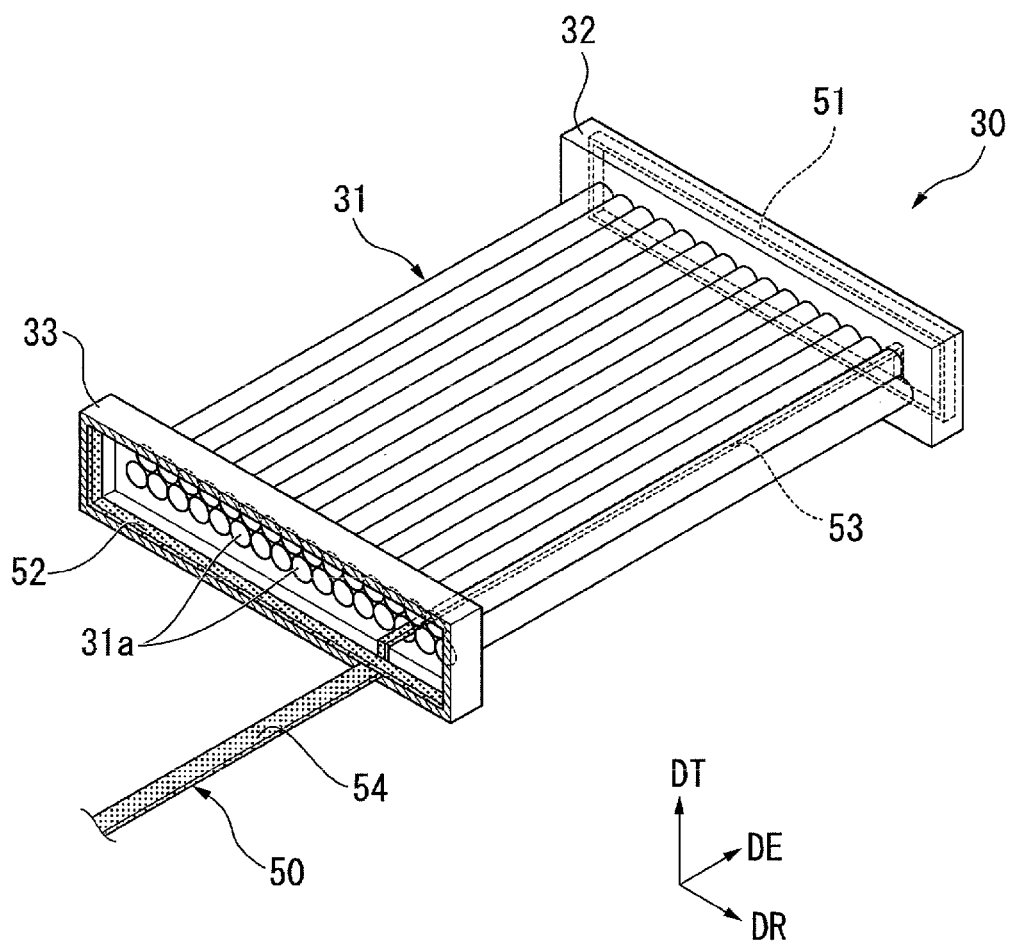
FIG. 6 is a partial sectional perspective view showing a heat exchanger in this embodiment.

The heat exchanger 30 is a portion where the refrigerant W is generated. FIG. 6 is a partial sectional perspective view showing the heat exchanger 30. As shown in FIG. 6, the heat exchanger 30 includes a circulating section 31, a first lid section 32, and a second lid section 33.

The circulating section 31 includes a plurality of tubular pipe sections 31a extending in one direction. In this embodiment, the one direction in which the pipe sections 31a extend is orthogonal to, for example, the rotation axis direction DR. The pipe sections 31a are opened on both sides in the one direction in which the pipe sections 31a extend. A sectional shape of the pipe sections 31a orthogonal to the one direction in which the pipe sections 31a extend is, for example, a circular shape. In the following explanation, the one direction in which the pipe sections 31a extend is referred to as "extending direction DE" and indicated by a DE axis in the figures as appropriate. The first region F1 and the second region F2 are divided based on the rotation axis R in the extending direction DE orthogonal to the rotation axis direction DR.

In this embodiment, the circulating section 31 is configured by laminating, along a direction orthogonal to both of the rotation axis direction DR and the extending direction DE, a plurality of layers each configured by arranging the plurality of pipe sections 31a along the rotation axis direction DR. In the following explanation, the direction orthogonal to both of the rotation axis direction DR and the extending direction DE is referred to as "thickness direction DT" and indicated by a DT axis in the figures as appropriate. In this embodiment, a dimension in the thickness direction DT of the circulating section 31 is, for example, smaller than a dimension in the rotation axis direction DR of the circulating section 31 and is the smallest among dimensions of the circulating section 31 in directions orthogonal to the extending direction DE.

The first lid section 32 is coupled to an end portion on one side (a +DE side) in the extending direction DE in the circulating section 31. The first lid section 32 has a rectangular parallelepiped box shape long in the rotation axis direction DR. One ends in the extending direction DE of the pipe sections 31a are opened on the inside of the first lid section 32. As shown in FIG. 3, a partition section 32a is provided on the inside of the first lid section 32. The partition section 32a partitions the inside of the first lid section 32 into a first space S1 and a second space S2 arranged in the rotation axis direction DR. In FIG. 3, the first space S1 is located on the right side (a +DR side) of the second space S2.

A communication hole 32b connecting the first space S1 and the inside of the second circulation duct 26 is formed in the first lid section 32. A communication hole 32c connecting the second space S2 and the inside of the first circulation duct 25 is formed in the first lid section 32.

The second lid section 33 is coupled to an end portion on the other side (a −DE side) in the extending direction DE in the circulating section 31, that is, an end portion on the opposite side of the side to which the first lid section 32 is connected with respect to the circulating section 31. As shown in FIG. 6, the second lid section 33 has a rectangular parallelepiped box shape long in the rotation axis direction DR. The other ends in the extending direction DE of the pipe sections 31a are opened on the inside of the second lid section 33. Unlike the first lid section 32, the inside of the second lid section 33 is not partitioned. The inside of the second lid section 33 is connected to each of the first space S1 and the second space S2 on the inside of the first lid section 32 via the insides of the pipe sections 31a of the circulating section 31. The second lid section 33 is coupled to the refrigerant sender 50. Consequently, the heat exchanger 30 is coupled to the refrigerant sender 50. In FIG. 6, a wall on the other side in the extending direction DE in the second lid section 33 is omitted.

The first circulation duct 25 is a duct extending from the heat exchanger 30 to a region on the other side (a −DR side) in the rotation axis direction DR of the moisture absorbing and releasing member 40 as shown in FIG. 4. One end portion of the first circulation duct 25 is coupled to the heat exchanger 30. The first circulation duct 25 includes an inflow port 25 connected to the communication hole 32c of the first lid section 32. The inside of the first circulation duct 25 is connected to the second space S2 via an inflow port 25b and the communication hole 32c. The other end portion of the first circulation duct 25 is disposed to be opposed to the moisture absorbing and releasing member 40 via a small gap G1. The air sent from the inside of the heat exchanger 30 to the moisture absorbing and releasing member 40 by the second blower 23 passes through the first circulation duct 25.

The first circulation duct 25 includes a first opening 25a opposed to the portion of the moisture absorbing and releasing member 40 located in the second region F2. The first opening 25a is located on the other side (the −DR side) in the rotation axis direction DR of the moisture absorbing and releasing member 40 and is opened on one side (the +DR side) in the rotation axis direction DR toward the moisture absorbing and releasing member 40. In this embodiment, the first circulation duct 25 includes a wall portion 25c opposed to the moisture absorbing and releasing member 40. The first opening 25a is a through-hole provided in the wall portion 25c. The wall portion 25c is a wall on one side in the rotation axis direction DR in the first circulation duct 25 and spreads in a direction orthogonal to the rotation axis direction DR.

The second circulation duct 26 is a duct extending from a region on one side (the +DR side) in the rotation axis direction DR of the moisture absorbing and releasing member 40 to the heat exchange section 30. One end portion of the second circulation duct 26 is disposed to be opposed to the moisture absorbing and releasing member 40 via a small gap G2. The other end portion of the second circulation duct 26 is coupled to the heat exchanger 30. The second circulation duct 26 includes an outflow port 26b connected to the communication hole 32b of the first lid section 32. The inside of the second circulation duct 26 is connected to the first space S1 via the outflow port 26b and the communication hole 32b. The air sent from the moisture absorbing and releasing member 40 to the inside of the heat exchanger 30 by the second blower 23 passes through the second circulation duct 26.

The second circulation duct 26 includes a second opening 26a opposed to the portion of the moisture absorbing and releasing member 40 located in the second region F2. The second opening 26a is located on one side (the +DR side) in the rotation axis direction DR of the moisture absorbing and releasing member 40 and is opened on the other side (the −DR side) in the rotation axis direction DR toward the moisture absorbing and releasing member 40. In this embodiment, the second circulation duct 26 includes a wall portion 26c opposed to the moisture absorbing and releasing member 40. The second opening 26a is a through-hole provided in the wall portion 26c. The wall portion 26c is a wall on the other side in the rotation axis direction DR in the second circulation duct 26 and spreads in the direction orthogonal to the rotation axis direction DR. The second opening 26a is disposed in a position where the second opening 26a and the first opening 25a sandwich the moisture absorbing and releasing member 40. In this embodiment, the predetermined direction is a direction substantially parallel to the rotation axis direction DR.

In this specification, "the predetermined direction is the direction substantially parallel to the rotation axis direction" includes a case in which the predetermined direction is strictly parallel to the rotation axis direction and a case in which the predetermined direction tilts with respect to the rotation axis direction, for example, within a range of ±15°.

Figure 7:
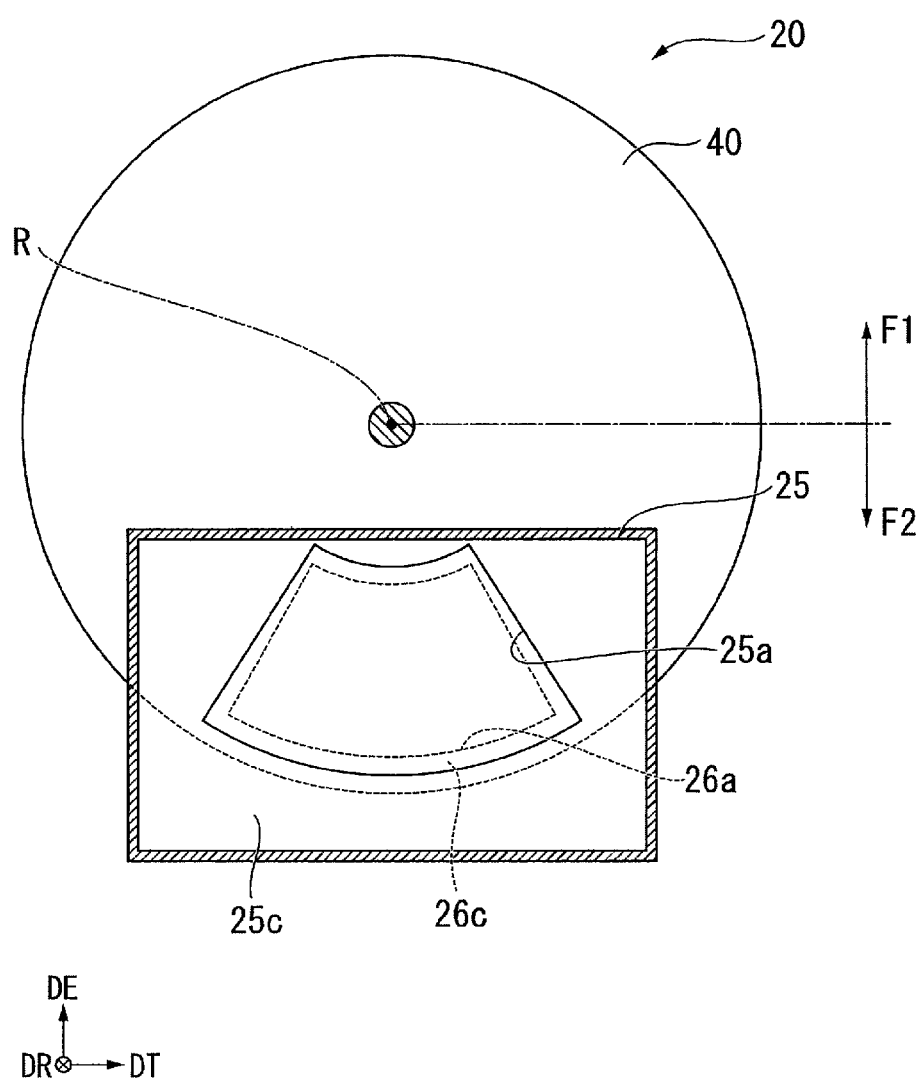
FIG. 7 is a sectional view showing a part of the refrigerant generator in the embodiment and is a VII-VII sectional view in FIG. 3.

FIG. 7 is a sectional view showing an example of the refrigerant generator 20 in this embodiment and is VII-VII sectional view in FIG. 3. As shown in FIG. 7, an opening area of the second opening 26a is smaller than an opening area of the first opening 25a. The opening area of the second opening 26a is not particularly limited if the opening area of the second opening 26a is smaller than the opening area of the first opening 25a. In this embodiment, the opening area of the second opening 26a is 50% or more of the opening area of the first opening 25a. The opening area of the second opening 26a is desirably, for example, 80% or more and less than 100% of the opening area of the first opening 25a. This is because most of the air discharged from the first opening 25a can be sent into the second opening 26a.

When viewed along the rotation axis direction DR, which is the predetermined direction, the entire first opening 25a and the entire second opening 26a overlap the moisture absorbing and releasing member 40. When viewed along the rotation axis direction DR, the entire second opening 26a overlaps the first opening 25a. In this embodiment, when viewed along the rotation axis direction DR, the entire second opening 26a is disposed to be separated further to the inner side than the inner edge of the first opening 25a.

When viewed along the rotation axis direction DR, at least a part of the peripheral edge portion of the second opening 26a in the wall portion 26c of the second circulation duct 26 overlaps the first opening 25a. In this embodiment, when viewed along the rotation axis direction DR, the peripheral edge portion of the second opening 26a in the wall portion 26c of the second circulation duct 26 overlaps the first opening 25a over the entire circumference. The peripheral edge portion of the second opening 26a in the wall portion 26c is a portion located further on the outer side than the inner edge of the second opening 26a in the wall portion 26c when viewed along the rotation axis direction DR and surrounding the second opening 26a.

When viewed along the rotation axis direction DR, the shape of the first opening 25a in this embodiment is different from a sectional shape of the first circulation duct 25. When viewed along the rotation axis direction DR, the shape of the second opening 26a in this embodiment is different from a sectional shape of the second circulation duct 26. The sectional shape of the first circulation duct 25 and the sectional shape of the second circulation duct 26 are, for example, rectangular shapes.

When viewed along the rotation axis direction DR, the first opening 25a and the second opening 26a in this embodiment have fan shapes centering on the rotation axis R of the moisture absorbing and releasing member 40. In this specification, the "fan shape" includes a shape surrounded by two arcs having the same curvature center and different radiuses and two line segments extending in the radius direction of a circle centering on the curvature center and respectively connecting both ends of the two arcs. In this embodiment, the first opening 25a and the second opening 26a have fan shapes surrounded by the two arcs and the two line segments. When viewed along the rotation axis direction DR, the curvature center of the arcs in the fan shape of the first opening 25a and the fan shape of the second opening 26a is the rotation axis R of the moisture absorbing and releasing member 40.

The heater 22 includes, as shown in FIG. 4, a heating main body section 22a and the second blower 23. The heating main body section 22a includes a heat sink 22b and a heater body 22c. The heat sink 22b is disposed on the inside of the first circulation duct 25. The heat sink 22b is disposed on the other side (the −DR side) of the portion of the moisture absorbing and releasing member 40 located in the second region F2 in the rotation axis direction DR. The heat sink 22b includes a base 22d and a plurality of fins 22e. For example, the base 22d is embedded and fixed in a wall portion on the other side (the −DR side) in the rotation axis direction DR in the first circulation duct 25. A surface on the other side in the rotation axis direction DR in the base 22d is exposed to the outer side surface of the first circulation duct 25. The plurality of fins 22e project from the base 22d on the inside of the first circulation duct 25.

The heater body 22c heats the heat sink 22b. In this embodiment, the heater body 22c is disposed on the outside of the first circulation duct 25. The heater body 22c is coupled to a portion of the base 22d of the heat sink 22b exposed to the outer side surface of the first circulation duct 25. When the heat sink 22b is heated by the heater body 22c, heat is discharged from the fins 22e disposed on the inside of the first circulation duct 25. Atmosphere on the inside of the first circulation duct 25 is heated. Consequently, the heating main body section 22a heats the atmosphere on the inside of the first circulation duct 25. The heater body 22c is, for example, an electric heater.

The second blower 23 is disposed on the inside of the second circulation duct 26. The second blower 23 is disposed on one side (the +DR side) of the portion of the moisture absorbing and releasing member 40 located in the second region F2 in the rotation axis direction DR. The second blower 23 is, for example, a centrifugal fan. The second blower 23 discharges the air sucked from the other side (the −DR side) in the rotation axis direction DR to the other side (the −DE side) in the extending direction DE from an exhaust port 23a. The exhaust port 23a is opened in the communication hole 32b of the first lid section 32. The second blower 23 sends the air to the first space S1 via the communication hole 32b.

The air discharged from the second blower 23 to the first space S1 is the air sucked from the other side (the −DR side) in the rotation axis direction DR of the second blower 23 via the second opening 26a of the second circulation duct 26 and is the air passed the portion of the moisture absorbing and releasing member 40 located in the second region F2. That is, the second blower 23 causes the air to pass the portion of the moisture absorbing and releasing member 40 located in the second region F2 different from the first region F1 and sends the air to the heat exchanger 30. In this embodiment, the air before passing the portion of the moisture absorbing and releasing member 40 located in the second region F2 is flowing on the inside of the first circulation duct 25. Accordingly, the heating main body section 22a heats the air before passing the portion of the moisture absorbing and releasing member 40 located in the second region F2.

In this way, in this embodiment, the heater 22 sends, with the second blower 23, the air heated by the heating main body section 22a to the portion of the moisture absorbing and releasing member 40 located in the second region F2 to heat the portion of the moisture absorbing and releasing member 40 located in the second region F2. Consequently, the second blower 23 sends the air around the portion heated by the heater 22 in the moisture absorbing and releasing member 40 to the heat exchanger 30.

As shown in FIG. 3, the air flowing into the heat exchanger 30 from the second blower 23 via the first space S1 flows into the inside of the second lid section 33 through the insides of the pipe sections 31a connected to the first space S1 among the plurality of pipe sections 31a. The air flowing into the inside of the second lid section 33 flows into the second space S2 through the insides of the pipe sections 31a connected to the second space S2 among the plurality of pipe sections 31a and flows into the inside of the first circulation duct 25 from the communication hole 32c. The air flowing into the inside of the first circulation duct 25 is heated by the heating main body section 22a, flows into the inside of the second circulation duct 26 passing the portion of the moisture absorbing and releasing member 40 located in the second region F2 again and is sucked by the second blower 23.

As explained above, the refrigerant generator 20 includes a circulation path 27 that passes the portion of the moisture absorbing and releasing member 40 located in the second region F2 and the heat exchanger 30. The circulation path 27 is a path through which the air circulates to pass the first circulation duct 25, the portion of the moisture absorbing and releasing member 40 located in the second region F2, and the second circulation duce 26 in this order from the heat exchanger 30 and return to the heat exchanger 30 again. The second bower 23 circulates the air in the circulation path 27. The air circulating in the circulation path 27 passes the heating main body section 22a in the first circulation duct 25. The gaps G1 and G2 are slightly provided between the moisture absorbing and releasing member 40 and the first circulation duct 25 and the second circulation duct 26. However, the circulation path 27 is substantially sealed. The air is suppressed from flowing into the inside of the circulation path 27 from the outside. In the following explanation, the air circulating in the circulation path 27 is referred to as air AR2.

The cooling duct 21 is a duct including an inflow port disposed on one side (the +DR side) of the portion of the moisture absorbing and releasing member 40 located in the first region F1 in the rotation axis direction DR. The air AR1 discharged from the first blower 60 and passed the portion of the moisture absorbing and releasing member 40 located in the first region F1 flows into the cooling duct 21. The cooling duct 21 extends from a region on one side of the portion of the moisture absorbing and releasing member 40 located in the first region F1 toward the heat exchanger 30.

The cooling duct 21 includes a cooling passage section 21a extending in the rotation axis direction DR. In the cooling passage section 21a, the circulating section 31 of the heat exchanger 30 is disposed to pierce through the cooling passage section 21a in the extending direction DE. Consequently, the circulating section 31 is disposed on the inside of the cooling passage section 21a. The air AR1 passing the cooling passage section 21a is blown against the outer surface of the circulating section 31 and passes the circulating section 31 in the rotation axis direction DR. Consequently, the circulating section 31 is cooled by the air AR1. That is, the heat exchanger 30 is cooled by the air AR1 discharged from the first blower 60 and passed through the moisture absorbing and releasing member 40. In FIG. 3, in the cooling passage section 21a, the air AR1 passes the circulating section 31 from the right side to the left side. The end portion on the other side (the −DR side) in the rotation axis direction DR in the cooling passage section 21a is opened. The opening of the cooling passage section 21a is, for example, an outflow port of the cooling duct 21.

When the air AR1 is sent to the portion of the moisture absorbing and releasing member 40 located in the first region F1 from the first blower 60, vapor included in the air AR1 is absorbed by the portion of the moisture absorbing and releasing member 40 located in the first region F1. The portion of the moisture absorbing and releasing member 40, which has absorbed the vapor, moves from the first region F1 to the second region F2 when the moisture absorbing and releasing member 40 is rotated by the motor 24. The air AR2 having a relatively high temperature heated by the heating main body section 22a passes the portion of the moisture absorbing and releasing member 40 located in the second region F2. Consequently, the moisture absorbed by the moisture absorbing and releasing member 40 vaporizes and is released to the air AR2.

The air AR2 including the vapor absorbed from the air AR1 bypassing through the moisture absorbing and releasing member 40 is sent to the heat exchanger 30 by the second blower 23. The air AR2 flowing into the heat exchanger 30 from the first space S1 flows on the inside of the circulating section 31. More specifically, the air AR2 flows on the insides of the pipe sections 31*a* of the circulating section 31. The circulating section 31 is cooled from the outside by the air AR1 flowing along the rotation axis direction DR through the cooling passage section 21*a* of the cooling duct 21.

When the circulating section 31 is cooled, the air AR2 having a relatively high temperature flowing on the insides of the pipe sections 31*a* is cooled. The vapor included in the air AR2 condenses into liquid water, that is, the refrigerant W. In this way, the heat exchanger 30 is cooled to generate the refrigerant W from the air AR2 flowing into the heat exchanger 30.

In this embodiment, the refrigerant sender 50 is made of a porous member and transfers the refrigerant W with the capillary phenomenon. Examples of the material of the refrigerant sender 50 include polypropylene, cotton, and porous metal. The material of the refrigerant sender 50 is desirably a material that can set the surface tension of the refrigerant sender 50 relatively large. The refrigerant sender 50 includes, as shown in FIG. 6, a first capturing section 51, a second capturing section 52, a third capturing section 53, and a coupling section 54.

The first capturing section 51 is fixed to an edge portion on one side (a +DE side) in the extending direction DE of the inner side surface of the first lid section 32. The first capturing section 51 has a thin belt shape and is formed in a rectangular frame shape along the edge portion of the first lid section 32. The second capturing section 52 is fixed to the edge portion on the other side (a −DE side) in the extending direction DE of the inner side surface of the second lid section 33. The second capturing section 52 has a thin belt shape and is formed in a rectangular shape along the edge portion of the second lid section 33.

The third capturing section 53 extends from the first capturing section 51 to the second capturing section 52 through the insides of the pipe sections 31*a* and couples the first capturing section 51 and the second capturing section 52. The third capturing section 53 has a thin belt shape extending in the extending direction DE. In this embodiment, as shown in FIG. 6, the third capturing section 53 is disposed on the inside of one pipe section 31*a* among the plurality of pipe sections 31*a*. However, the third capturing section 53 is not limited to this. The third capturing section 53 may be provided on the inside of a part of the plurality of pipe sections 31*a* or may be provided on the insides of all the plurality of pipe sections 31*a*. When the third capturing section 53 is provided on the inside of a part of the plurality of pipe sections 31*a*, the third capturing section 53 may be provided on the insides of two or more pipe sections 31*a*.

Figure 8:
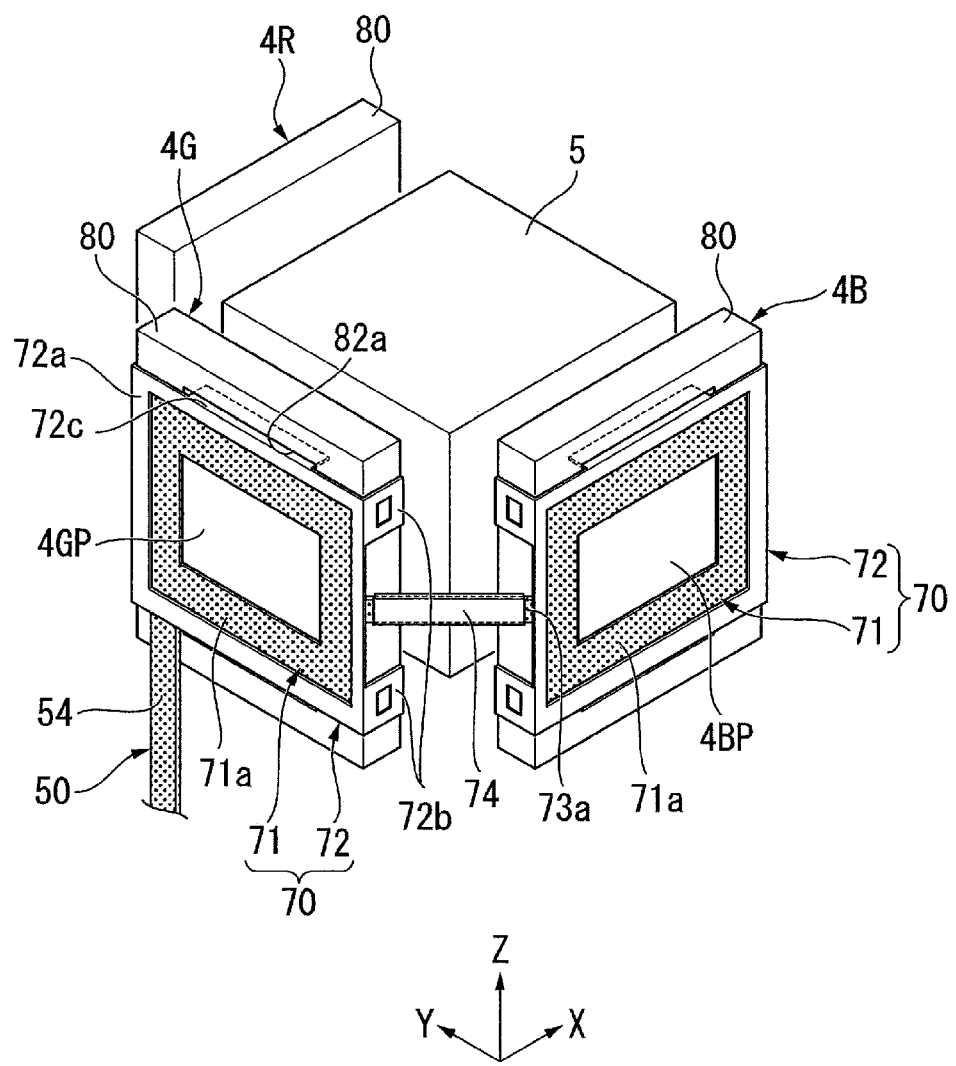
FIG. 8 is a perspective view showing a light modulating unit and a light combination optical system in the embodiment.

The coupling section 54 is a portion that couples the refrigerant generator 20 and the cooling targets. In this embodiment, the coupling section 54 is coupled to the second capturing section 52 and projects from the inside of the second lid section 33 to the outside of the second lid section 33 piercing through a wall of the second lid section 33. As shown in FIG. 8, the connecting section 54 projecting to the outside of the second lid section 33 extends to the light modulating unit 4G, which is the cooling target. FIG. 8 is a perspective view showing the light modulating units 4R, 4G, and 4B and the light combination optical system 5. The coupling section 54 has a thin belt shape. As shown in FIG. 6, the width of the coupling section 54 is larger than, for example, the width of the first capturing section 51, the width of the second capturing section 52, and the width of the third capturing section 53.

The light modulating units 4R, 4G, and 4B, which are the cooling targets in this embodiment, are explained more in detail. In the following explanation, an up-down direction Z, a positive side of which is an upper side and a negative side of which is a lower side, is indicated by a Z axis in the figures as appropriate. A direction parallel to an optical axis AX of a projection lens on the most light emission side in the projection optical device 6, that is, a direction parallel to a projecting direction of the projection optical device 6 is referred to as "optical axis direction X" and indicated by an X axis in the figures as appropriate. The optical axis direction X is orthogonal to the up-down direction Z. A direction orthogonal to both of the optical axis direction X and the up-down direction Z is referred to as "width direction Y" and indicated by a Y axis in the figures as appropriate.

The up-down direction Z, the upper side, and the lower side are simply names for explaining relative positional relations among the sections. Actual disposition relations and the like may be disposition relations and the like other than the disposition relations and the like indicated by these names.

Figure 9:
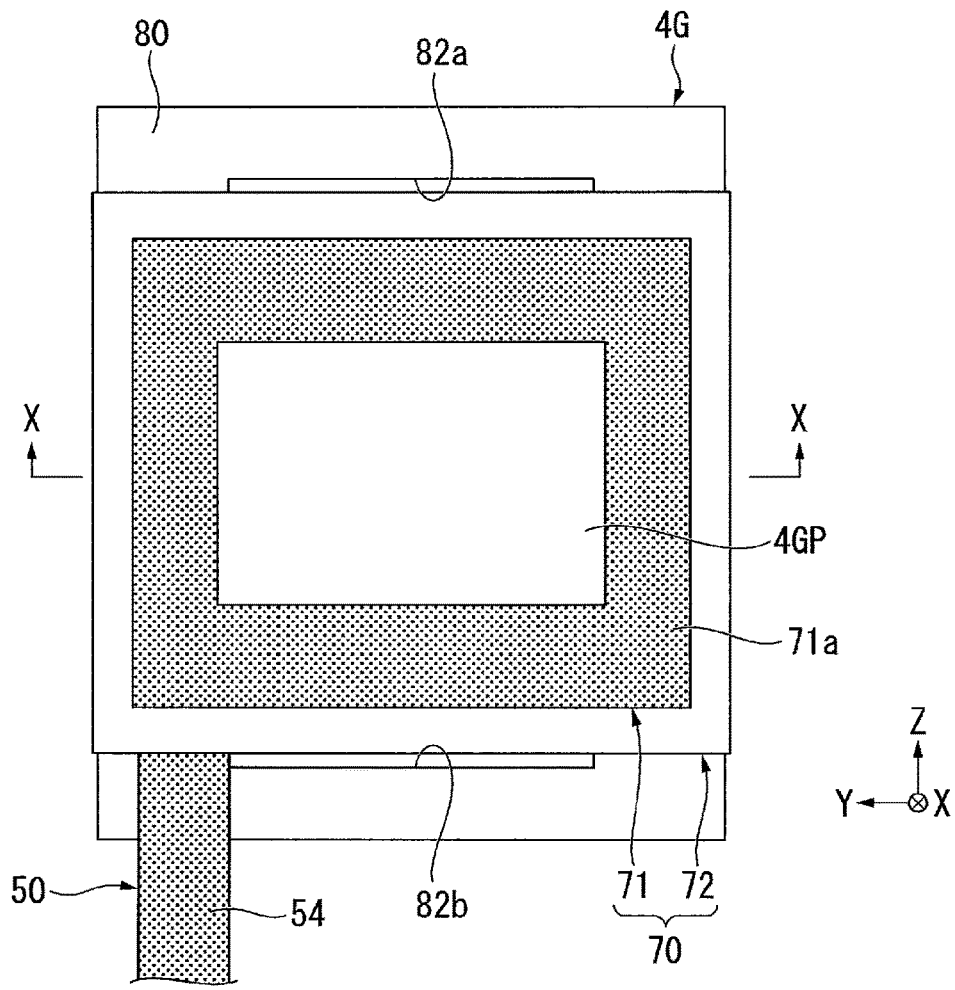
FIG. 9 is a diagram of the light modulating unit in the embodiment viewed from a light incident side.
Figure 10:
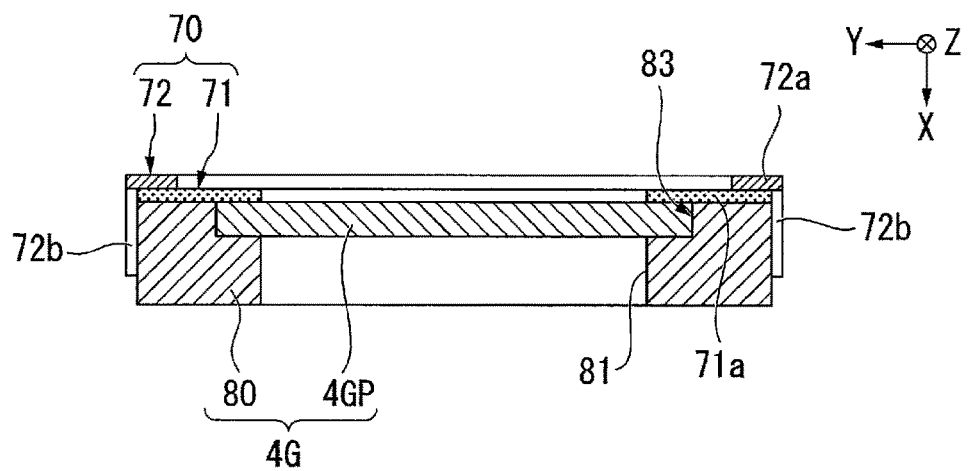
FIG. 10 is a diagram showing the light modulating unit in the embodiment and is a X-X sectional view in FIG. 9.

FIG. 9 is a diagram of the light modulating unit 4G viewed from the light incident side. FIG. 10 is a diagram showing the light modulation unit 4G and is a X-X sectional view in FIG. 9.

The light modulating unit 4R, the light modulating unit 4G, and the light modulating unit 4B, which are the cooling targets, are disposed to surround the periphery of the light combination optical system 5 as shown in FIG. 8. The light modulating unit 4R and the light modulating unit 4B are disposed on the opposite sides each other across the light combination optical system 5 in the width direction Y. The light modulating unit 4G is disposed on a light incident side (a −X side) in the optical axis direction X of the light combination optical system 5. The structure of the light modulating unit 4R, the structure of the light modulating unit 4G, and the structure of the light modulating unit 4B are the same except that positions where the light modulating unit 4R and the light modulating unit 4G are disposed and postures of the light modulating unit 4R and the light modulating unit 4G are different. Therefore, in the following explanation, only the light modulating unit 4G is sometimes representatively explained.

The light modulating unit 4G includes a retaining frame 80 that retains the light modulator 4GP. As shown in FIGS. 8 to 10, the retaining frame 80 has a substantially rectangular parallelepiped shape flat in a direction in which light is made incident on the light modulator 4GP and long in the up-down direction Z. The direction in which light is made incident on the light modulator 4GP is, for example, the optical axis direction X.

As shown in FIG. 10, the retaining frame 80 includes a through-hole 81 piercing through the retaining frame 80 in the direction in which light is made incident. A step section 83 for expanding the width of the through-hole 81 is provided at the edge on the light incident side (the −X side) of the through-hole 81. The light modulator 4GP is fit in the step section 83 and retained by the retaining frame 80. As shown in FIG. 9, insertion grooves 82*a* and 82*b* are formed in portions on both sides in the up-down direction Z on a surface on the light incident side of the retaining frame 80.

As shown in FIGS. 8 to 10, the projector 1 further includes a cooling facilitating section 70 provided in the light modulating unit 4G, which is the cooling target. The cooling facilitating section 70 includes a refrigerant retaining section 71 and a fixing member 72. The refrigerant retaining section 71 is attached to the surface of the retaining frame 80 of the light modulating unit 4G, which is the cooling target. In this embodiment, the refrigerant retaining section 71 is provided on a surface on the light incident side (the −X side) of the light modulator 4GP in the retaining frame 80. The refrigerant retaining section 71 is made of a porous member that retains the refrigerant W. Examples of the material of the refrigerant retaining section 71 include polypropylene, cotton, and porous metal. The material of the refrigerant retaining section 71 can be, for example, the same as the material of the refrigerant sender 50. The material of the refrigerant retaining section 71 is desirably a material that can set the surface tension of the refrigerant retaining section 71 relatively large.

Figure 11:
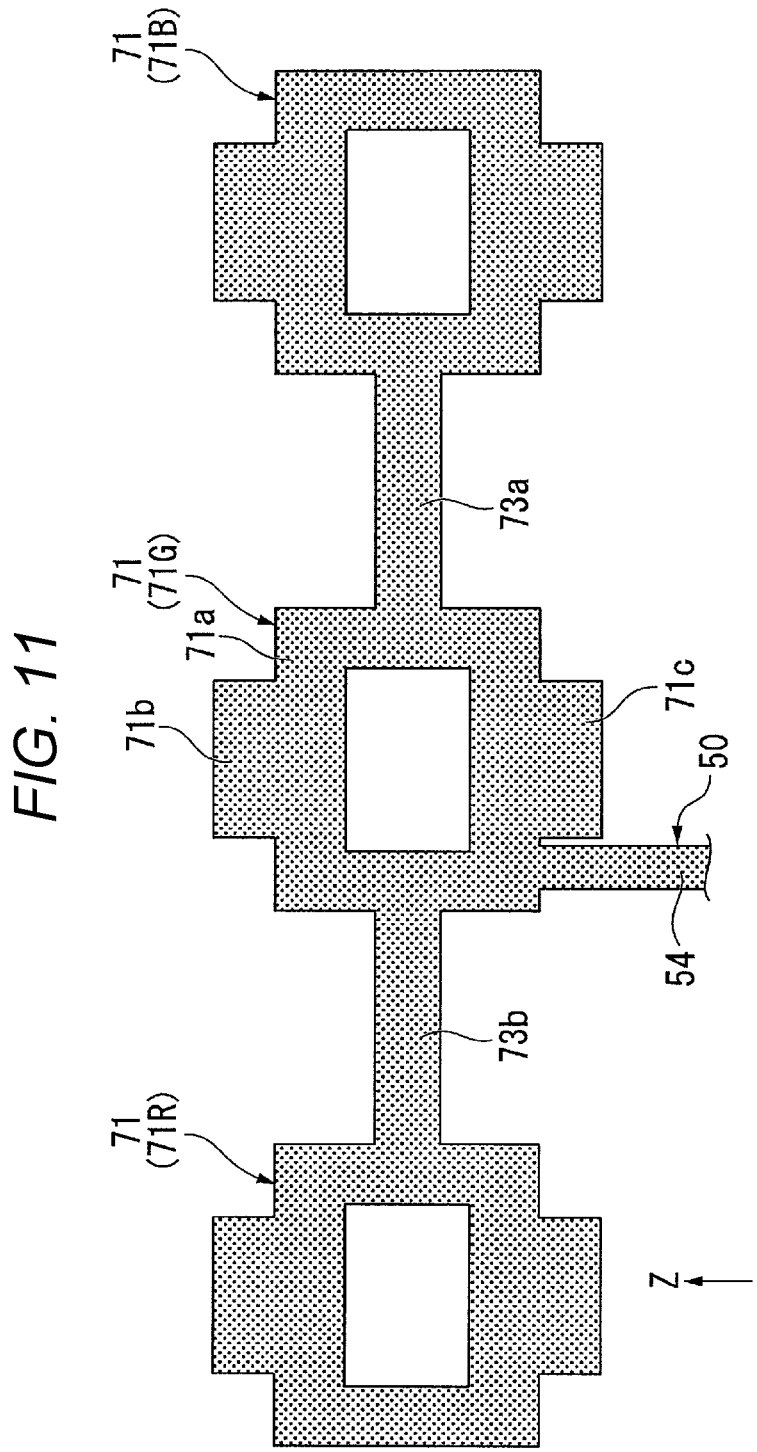
FIG. 11 is a diagram showing a refrigerant retaining section in the embodiment.

FIG. 11 is a diagram showing the refrigerant regaining section 71. The refrigerant retaining section 71 includes, as shown in FIG. 11, a main body section 71a having a rectangular frame shape and inserting sections 71b and 71c provided at the end portions on both sides in the up-down direction Z in the main body section 71a. As shown in FIG. 10, the main body section 71a covers a part of a surface on the light incident side (the −X side) of the light modulator 4GP in the retaining frame 80. A portion on the inner edge side in the main body section 71a covers an outer edge portion of the light modulator 4GP. The inserting section 71b is bent and inserted into the insertion groove 82a of the retaining frame 80. The inserting section 71c is bent and inserted into an insertion groove 82b of the retaining frame 80.

The fixing member 72 is a member that fixes the refrigerant retaining section 71. The fixing member 72 is a tabular member as shown in FIGS. 8 and 10. The fixing member 72 is made of, for example, metal. The fixing section 72 includes a frame section 72a having a rectangular frame shape, attaching sections 72b, and inserting sections 72c. As shown in FIGS. 9 and 10, the frame section 72a covers the outer edge portion of the refrigerant retaining section 71. The retaining frame 80, the refrigerant retaining section 71, and the frame section 72a are laminated in a direction of light passing through the light modulating unit 4G (the optical axis direction X). In the following explanation, a direction in which the retaining frame 80, the refrigerant retaining section 71, and the frame section 72a are laminated is simply referred to as "laminating direction". The fixing member 72 holds and fixes, with the frame section 72a, the refrigerant retaining section 71 in the laminating direction (the optical axis direction X) between the fixing member 72 and the retaining frame 80.

The inner edge of the frame section 72a is provided further on the outer side than the inner edge of the refrigerant retaining section 71. Accordingly, a part of the refrigerant retaining section 71, that is, in this embodiment, a portion further on the inner side than the frame section 72a is exposed when viewed from the fixing member 72 side in the laminating direction.

As shown in FIGS. 8 and 10, the attaching sections 72b are respectively provided at both end portions in the width direction Y at both end portions in the up-down direction Z of the frame section 72a. The attaching sections 72b project to the retaining frame 80 side (a +X side) from the frame section 72a. The attaching sections 72b are engaged with protrusions provided on a side surface of the retaining frame 80. Consequently, the fixing member 72 is fixed to the retaining frame 80.

The inserting sections 72c are provided at both end portions in the up-down direction Z of the frame section 72a. The inserting sections 72c project to the retaining frame 80 side (the +X side) from the frame section 72a. The inserting sections 72c are inserted into the insertion grooves 82a and 82b of the retaining frame 80. The inserting sections 72c press the inserting sections 71b and 71c of the refrigerant retaining section 71 on the inside of the insertion grooves 82a and 82b.

The cooling facilitating section 70 is provided in each of the plurality of light modulating units 4R, 4G, and 4B. That is, the refrigerant retaining section 71 and the fixing member 72 are provided in each of the plurality of light modulating units 4R, 4G, and 4B. As shown in FIG. 11, a refrigerant retaining section 71G provided in the light modulating unit 4G among the light modulating units 4R, 4G, and 4B is coupled to the refrigerant sender 50. More in detail, the coupling section 54 of the refrigerant sender 50 is coupled to the lower end portion of the refrigerant retaining section 71G.

A refrigerant retaining section 71B attached to the light modulating unit 4B and a refrigerant retaining section 71R attached to the light modulating unit 4R are the same as the refrigerant retaining section 71G attached to the light modulating unit 4G except that the coupling section 54 is not coupled to the refrigerant retaining section 71R.

In this embodiment, coupling sections 73a and 73b made of a porous member that couple the refrigerant retaining sections 71 provided in the plurality of light modulating units 4R, 4G, and 4B to one another are provided. In this embodiment, the refrigerant retaining section 71B attached to the light modulating unit 4B and the refrigerant retaining section 71R attached to the light modulating unit 4R are coupled to, via the coupling sections 73a and 73b, both sides of the refrigerant retaining section 71G attached to the light modulating unit 4G.

The coupling section 73a couples the refrigerant retaining section 71G attached to the light modulating unit 4G and the refrigerant retaining section 71B attached to the light modulating unit 4B. Consequently, the refrigerant retaining section 71B is coupled to the coupling section 54 of the refrigerant sender 50 via the refrigerant retaining section 71G. As shown in FIG. 8, a covering section 74 that covers the coupling section 73a is provided in the coupling section 73a. The covering section 74 is, for example, a film made of resin.

The coupling section 73b couples the refrigerant retaining section 71 attached to the light modulating unit 4G and the refrigerant retaining section 71 attached to the light modulating unit 4R. Consequently, the refrigerant retaining section 71R is coupled to the coupling section 54 of the refrigerant sender 50 via the refrigerant retaining section 71G. Although not illustrated, the covering section 74 is provided in the coupling section 73b as in the coupling section 73a.

The refrigerant W generated by the refrigerant generator 20 is transferred to the refrigerant retaining section 71G by the coupling section 54 of the refrigerant sender 50. The refrigerant W transferred to the refrigerant retaining section 71G is transferred to the refrigerant retaining section 71B via the coupling section 73a and transferred to the refrigerant retaining section 71R via the coupling section 73b. In this way, the refrigerant W generated by the refrigerant generator 20 is transferred to the three light modulating units 4R, 4G, and 4B. When the refrigerant W transferred and retained in the refrigerant retaining section 71 vaporizes, the light modulating units 4R, 4G, and 4B, which are the cooling targets, are cooled. More in detail, when the refrigerant W retained in the refrigerant retaining section 71 vaporizes, the retaining frame 80 attached with the refrigerant retaining section 71 is cooled. When the retaining frame 80 is cooled, the light modulators 4RP, 4GP, and 4BP retained by the retaining frame 80 are cooled. Consequently, the light modulators 4RP, 4GP, and 4BP, which are the cooling targets, can be cooled by the cooler 10.

According to this embodiment, the cooler 10 can transfer, with the refrigerant sender 50, the refrigerant W generated by the refrigerant generator 20 to the cooling targets, take heat from the cooling targets using vaporization of the refrigerant W, which is endothermic reaction, and cool the cooling targets. The cooling by the vaporization of the refrigerant W can actively take heat from the cooling targets. Therefore, the cooling by the vaporization of the refrigerant W is excellent in cooling performance compared with when the cooling targets are cooled by simply transferring heat to the refrigerant as in the air cooling and the liquid cooling. Consequently, when the same cooling performance as the cooling performance of the air cooling and the liquid cooling is obtained, it is easier to reduce the size of the entire cooler 10 compared with the air cooling and the liquid cooling.

In the case of the cooling by the vaporization of the refrigerant W, it is possible to improve cooling performance by increasing a surface area of the vaporizing refrigerant W in contact with the cooling targets. Accordingly, even if the cooling performance by the cooler 10 is increased, it is possible to suppress noise from increasing. Consequently, according to this embodiment, it is possible to obtain the projector 1 including the cooler 10 excellent in the cooling performance, small in size, and excellent in silence.

According to this embodiment, since the refrigerant W can be generated in the refrigerant generator 20, a user does not need consume labor and time for supplying the refrigerant W. Therefore, convenience of the user can be improved. Generation of the refrigerant W can be adjusted by the refrigerant generator 20 to generate the refrigerant W as necessary when the refrigerant W is necessary. Therefore, it is unnecessary to store the refrigerant W in a storage tank or the like. The weight of the projector 1 can be reduced.

According to this embodiment, vapor included in the air AR1 sent from the first blower 60 can be absorbed by the moisture absorbing and releasing member 40. Moisture absorbed by the moisture absorbing and releasing member 40 can be released, as vapor, into the air AR2 sent by the second blower 23. The moisture released to the air AR2 as the vapor can be condensed by the heat exchanger 30 to generate the refrigerant W. Consequently, according to this embodiment, it is possible to generate the refrigerant W from the atmosphere in the projector 1.

For example, when the humidity of the air AR2 sent from the second blower 23 to the heat exchanger 30 is relatively low, even if the heat exchanger 30 is cooled, the refrigerant W is sometimes less easily generated by the refrigerant generator 20. The humidity of the air AR2 sent to the heat exchanger 30 sometimes decreases, for example, when the air or the like on the outside of the projector 1 mixes in the air AR2. In such a case, refrigerant generation efficiency of the refrigerant generator 20 is deteriorated.

On the other hand, according to this embodiment, the refrigerant generator 20 includes the circulation path 27 that passes the portion of the moisture absorbing and releasing member 40 located in the second region F2 and the heat exchanger 30. Accordingly, it is possible to suppress the air on the outside of the projector 1 from entering the circulation path 27 by substantially sealing the circulation path 27. It is easy to maintain the humidity of the air AR2 sent to the heat exchanger 30 in a relatively high state. Therefore, it is possible to suitably generate the refrigerant W by cooling the heat exchanger 30. As a result, it is possible to suppress the refrigerant generation efficiency of the refrigerant generator 20 from being deteriorated.

Even when the circulation path 27 is substantially sealed, since the small gap GP2 is formed between the moisture absorbing and releasing member 40 and the second circulation duct 26, it is likely that the air on the outside of the circulation path 27 is sucked into the second circulation duct 26 from the gap G2 via the second opening 26a when the air AR2 flows into the second circulation duct 26 from the second opening 26a. In this case, the humidity of the air AR2 circulating in the circulation path 27 is reduced by the air flowing in from the outside of the circulation path 27. Accordingly, it is likely that the refrigerant W is less easily generated and the refrigerant generation efficiency of the refrigerant generator 20 is deteriorated.

On the other hand, according to this embodiment, the opening area of the second opening 26a is smaller than the opening area of the first opening 25a. When viewed along the rotation axis direction DR, which is the predetermined direction, the entire second opening 26a overlaps the first opening 25a. Accordingly, as shown in FIG. 7, when viewed along the rotation axis direction DR, a part of the first opening 25a is located on the outside of the second opening 26a. Consequently, as shown in FIG. 4, a part of the air AR2 discharged from the first opening 25a and passing through the moisture absorbing and releasing member 40 is sent to the outer side of the second opening 26a.

Therefore, even when the air is sucked into the second opening 26a from the gap G2, it is possible to allow the air AR2 from the first opening 25a sent to the outer side of the second opening 26a to be easily sucked and prevent the air on the outside of the circulation path 27 from being easily sucked into the second opening 26a. In other words, it is possible to form, around the second opening 26a, a barrier by the air AR2 discharged from the first opening 25a. It is possible to suppress, with the barrier, the air from the outside of the circulation path 27 from being sucked into the second opening 26a from the gap G2. Accordingly, it is possible to suppress the humidity of the air AR2 in the circulation path 27 from decreasing and suppress the refrigerant generation efficiency of the refrigerant generator 20 from being deteriorated.

A part of the air AR2 from the first opening 25a sent to the outer side of the second opening 26a sometimes leaks to the outside of the circulation path 27. However, the deterioration in the refrigerant generation efficiency that occurs when the air on the outside flows into the circulation path 27 and the humidity of the air AR2 decreases is larger than the deterioration in the refrigerant generation efficiency that occurs when a part of the air AR2 from the first opening portion 25a leaks to the outside of the circulation path 27. Accordingly, even when a part of the air AR2 from the first opening 25a leaks to the outside of the circulation path 27, it is possible to suppress the refrigerant generation efficiency of the refrigerant generator 20 from being deteriorated as a result of the leak of the air AR2.

According to this embodiment, when viewed along the rotation axis direction DR, the entire second opening 26a is disposed to be separated further to the inner side than the inner edge of the first opening 25a. Accordingly, a part of the air AR2 discharged from the first opening 25a to the moisture absorbing and releasing member 40 is sent over the entire circumference surrounding the outer side of the second opening 26a. Consequently, it is possible to form the barrier by the air AR2 over the entire circumference around the second opening 26a. Therefore, it is possible to suppress the air from the outside of the circulation path 27 from being sucked into the second opening 26a from the gap G2. Accordingly, it is possible to further suppress the humidity of the air AR2 in the circulation path 27 from decreasing and further suppress the refrigerant generation efficiency of the refrigerant generator 20 from being deteriorated.

According to this embodiment, the second circulation duct 26 includes the wall portion 26c opposed to the moisture absorbing and releasing member 40. The second opening 26a is the through-hole provided in the wall portion 26c. When viewed along the rotation axis direction DR, at least a part of the peripheral edge portion of the second opening 26a in the wall portion 26c overlaps the first opening 25a. Accordingly, at least a part of the air AR2 discharged to the moisture absorbing and releasing member 40 from a portion of the first opening 25a located further on the outer side than the second opening 26a when viewed along the rotation axis direction DR is blown against the wall portion 26c. Consequently, compared with when the wall portion 26c is not provided, the air AR2 sent from the first opening 25a to the outer side of the second opening 26a is easily sucked into the second opening 26a and less easily leaks to the outside of the circulation path 27. Therefore, it is possible to increase the air AR2 flowing into the second opening 26a from the first opening 25a. It is possible to further improve the refrigerant generation efficiency of the refrigerant generator 20.

In particular, in this embodiment, when viewed along the rotation axis direction DR, the peripheral edge portion of the second opening 26a in the wall portion 26c overlaps the first opening 25a over the entire circumference. Accordingly, the air AR2 discharged from the first opening 25a is blown against the wall portion 26c over the entire circumference around the second opening 26a. Consequently, it is possible to more easily suck the air AR2 into the second opening 26a with the wall portion 26c. Therefore, it is possible to further increase the air AR2 flowing into the second opening 26a from the first opening 25a and further improve the refrigerant generation efficiency of the refrigerant generator 20.

In this embodiment, the predetermined direction in which the first opening 25a and the second opening 26a sandwich the moisture absorbing and releasing member 40 is the axial direction of the rotation axis R of the moisture absorbing and releasing member 40, that is, the rotation axis direction DR. Accordingly, it is easy to suitably dispose the entire first opening 25a and the entire second opening 26a close to the moisture absorbing and releasing member 40. It is possible to suitably reduce the gaps G1 and G2 between the circulation ducts and the moisture absorbing and releasing member 40. Consequently, it is possible to further suppress the air on the outside from flowing into the circulation path 27. Therefore, it is possible to further suppress the refrigerant generation efficiency of the refrigerant generator 20 from being deteriorated.

According to this embodiment, when viewed along the rotation axis direction DR, the first opening 25a and the second opening 26a have the fan shapes centering on the rotation axis R of the moisture absorbing and releasing member 40. Accordingly, in the first opening 25a and the second opening 26a, the dimension in the circumferential direction centering on the rotation axis R is smaller in a portion closer to the rotation axis R and is larger in a portion farther from the rotation axis R. In the rotating moisture absorbing and releasing member 40, the distance in the circumferential direction of movement per unit time is smaller in the portion closer to the rotation axis R and is larger in the portion farther from the rotation axis R. Accordingly, in a position close to the rotation axis R, the portion in which the distance in the circumferential direction of the movement per unit time is small in the moisture absorbing and releasing member 40 is opposed to the portion in which the dimension in the circumferential direction is small is in the first opening 25a and the second opening 26a. On the other hand, in a position far from the rotation axis R, the portion in which the distance in the circumferential direction of the movement per unit time is large in the moisture absorbing and releasing member 40 is opposed to the portion in which the dimension in the circumferential direction is large in the first opening 25a and the second opening 26a. Consequently, it is possible to fix, irrespective of a radial direction position from the rotation axis R, a time in which a part of the rotating moisture absorbing and releasing member 40 is opposed to the first opening 25a and the second opening 26a. Therefore, it is possible to suitably release moisture from the moisture absorbing and releasing member 40 to the air AR2 irrespective of the radial direction position. It is possible to further improve the refrigerant generation efficiency of the refrigerant generator 20.

According to this embodiment, when viewed along the rotation axis direction DR, the entire first opening 25a and the entire second opening 26a overlap the moisture absorbing and releasing member 40. Accordingly, it is possible to cause all the air AR2 sent into the second opening 26a from the first opening 25a to pass through the moisture absorbing and releasing member 40. Consequently, it is possible to suitably release moisture from the moisture absorbing and releasing member 40 to the air AR2. It is possible to further improve the refrigerant generation efficiency of the refrigerant generator 20.

According to this embodiment, the heater 22 includes the heat sink 22b disposed on the inside of the first circulation duct 25, the heater body 22c that heats the heat sink 22b, and the second blower 23. Accordingly, in the first circulation duct 25, the air AR2 before passing the portion of the moisture absorbing and releasing member 40 located in the second region F2 can be heated by the heat sink 22b and the heater body 22c. Consequently, the heater 22 can heat the portion of the moisture absorbing and releasing member 40 located in the second region F2 by sending the air AR2 to the moisture absorbing and releasing member 40 with the second blower 23. Therefore, even if the heat sink 22b and the heater body 22c that heat the air AR2 are disposed in positions apart from the moisture absorbing and releasing member 40, the moisture absorbing and releasing member 40 can be heated by the heater 22. Accordingly, it is possible to improve flexibility of the configuration of the heater 22.

According to this embodiment, the heat exchanger 30 is cooled by the air AR1 discharged from the first blower 60 and passed through the moisture absorbing and releasing member 40. Accordingly, it is unnecessary to separately provide a cooling section that cools the heat exchanger 30. It is possible to suppress the number of components of the projector 1 from increasing. Compared with when a blower is separately provided as a cooling section that cools the heat exchanger 30, it is possible to suppress noise caused by the projector 1 from increasing.

According to this embodiment, the first blower 60 sends the air AR1 to the light modulating units 4R, 4G, and 4B, which are the cooling targets. Accordingly, the refrigerant W transferred to the light modulating units 4R, 4G, and 4B is easily vaporized by the air AR1. The light modulating units 4R, 4G, and 4B can be further cooled. Since it is unnecessary to separately provide a blower that cools the cooling targets, it is possible to suppress the number of components of the projector 1 from increasing and suppress noise from increasing.

As explained above, in this embodiment, the vaporization of the refrigerant W fed to the cooling targets is facilitated using the first blower 60, which is the intake fan that takes the air on the outside into the inside of the projector 1. Accordingly, even if an output of the first blower 60 is reduced, it is possible to obtain cooling performance equivalent to cooling performance obtained when the cooler 10 is not provided. Therefore, it is possible to reduce the output of the first blower 60, which is the intake fan, and reduce noise caused by the first blower 60. It is possible to further improve the silence of the projector 1.

According to this embodiment, the refrigerant generator 20 includes the motor 24 that rotates the moisture absorbing and releasing member 40. Accordingly, the moisture absorbing and releasing member 40 can be stably rotated at constant speed. Consequently, it is possible to suitably release vapor from the air AR1 to the portion of the moisture absorbing and releasing member 40 located in the first region F1 and suitably release moisture to the air AR2 from the portion of the moisture absorbing and releasing member 40 located in the second region F2. Therefore, it is possible to efficiently generate the refrigerant W.

According to this embodiment, the refrigerant sender 50 transfers the refrigerant W with the capillary phenomenon. Accordingly, it is unnecessary to separately prepare power of a pump or the like in order to transfer the refrigerant W. Consequently, it is possible to suppress the number of components of the projector 1 from increasing. It is easier to reduce the projector 1 in size and weight.

According to this embodiment, the refrigerant sender 50 includes the coupling section 54 made of the porous member that couples the refrigerant generator 20 and the cooling targets. Accordingly, it is possible to absorb the refrigerant W in the coupling section 54 and transfer the refrigerant W with the capillary phenomenon.

According to this embodiment, the refrigerant sender 50 includes the second capturing section 52 provided on the inside of the second lid section 33. The second capturing section 52 is coupled to the connecting section 54. Accordingly, it is possible to absorb, with the second capturing section 52, the refrigerant W accumulated on the inside of the second lid section 33 and transfer the refrigerant W to the coupling section 54 with the capillary phenomenon. Consequently, it is easy to feed the generated refrigerant W to the cooling targets without waste.

According to this embodiment, the refrigerant sender 50 includes the first capturing section 51 provided on the inside of the first lid section 32 and the third capturing section 53 that couples the first capturing section 51 and the second capturing section 52. Consequently, it is possible to absorb, with the first capturing section 51, the refrigerant W accumulated on the inside of the first lid section 32 and transfer the refrigerant W to the second capturing section 52 via the third capturing section 53 with the capillary phenomenon. Therefore, it is possible to transfer the refrigerant W accumulated on the inside of the first lid section 32 from the second capturing section 52 to the coupling section 54 and transfer the refrigerant W to the cooling targets. Accordingly, it is easy to feed the generated refrigerant W to the cooling targets without waste.

According to this embodiment, the third capturing section 53 passes the insides of the pipe sections 31a. Accordingly, it is possible to absorb, with the third capturing section 53, the refrigerant W accumulated on the insides of the pipe sections 31a and transfer the refrigerant W to the cooling targets via the second capturing section 52 and the coupling section 54. Therefore, it is easy to feed the generated refrigerant W to the cooling targets without waste.

According to this embodiment, the width of the coupling section 54 is larger than, for example, the width of the first capturing section 51, the width of the second capturing section 52, and the width of the third capturing section 53. Accordingly, it is easy to set the width of the coupling section 54 relatively large. It is possible to increase an amount of the refrigerant W that can be transferred to the coupling section 54. Therefore, it is easy to feed the refrigerant W to the cooling targets with the refrigerant sender 50. It is easier to cool the cooling targets.

On the other hand, it is easy to set the width of the first capturing section 51, the width of the second capturing section 52, and the width of the third capturing section 53 relatively small. Accordingly, it is possible to reduce an amount of the refrigerant W retained by the first capturing section 51, the second capturing section 52, and the third capturing section 53. Consequently, it is possible to reduce an amount of the refrigerant W remaining on the inside of the heat exchanger 30 while being retained by the first capturing section 51, the second capturing section 52, and the third capturing section 53. It is easier to feed the generated refrigerant W to the cooling targets without waste.

According to this embodiment, the refrigerant retaining sections 71 that retain the refrigerant W are provided in the light modulating units 4R, 4G, and 4B, which are the cooling targets. Accordingly, the refrigerant W transferred to the light modulating units 4R, 4G, and 4B can be retained in the light modulating units 4R, 4G, and 4B by the refrigerant retaining sections 71 until the refrigerant W vaporizes. Consequently, it is easy to use the generated refrigerant W without waste. It is possible to further improve the cooling performance of the cooler 10.

According to this embodiment, the refrigerant retaining section 71 is attached to the surface of each of the light modulating units 4R, 4G, and 4B, which are the cooling targets, and is made of the porous member. At least a part of the refrigerant retaining section 71 is exposed when viewed from the refrigerant retaining section 71 side in the laminating direction. Accordingly, it is easy to vaporize the refrigerant W from the exposed portion of the refrigerant retaining section 71. It is possible to further improve the cooling performance of the cooler 10. Since the refrigerant retaining section 71 is made of the porous member, it is easy to uniformly spread, with the capillary phenomenon, the refrigerant W on the surface of the cooling target on which the refrigerant retaining section 71 is provided. It is easier to cool the cooling target.

For example, when the refrigerant retaining section 71 is fixed to the retaining frame 80 by an adhesive, in some case, the adhesive is absorbed by the refrigerant retaining section 71 and the hole of the refrigerant retaining section 71 made of the porous member is closed. Accordingly, in some case, the refrigerant W is less easily absorbed by the refrigerant retaining section 71 and is less easily retained by the refrigerant retaining section 71.

On the other hand, according to this embodiment, the fixing member 72 that holds and fixes the refrigerant retaining section 71 between the fixing member 72 and the retaining frame 80 is provided. Accordingly, it is possible to fix the refrigerant retaining section 71 to the retaining frame 80 without using an adhesive. Consequently, it is possible to suppress the refrigerant W from being less easily retained by the refrigerant retaining section 71. In this embodiment, the fixing member 72 is made of metal. Accordingly, the fixing member 72 has relatively high thermal conductivity and is easily cooled. Therefore, the temperature of the fixing member 72 easily drops with the air AR1 from the first blower 60 and the vaporization of the refrigerant W. It is easier to cool the cooling target in contact with the fixing member 72.

According to this embodiment, the refrigerant retaining section 71 is provided on the surface on the light incident side of the light modulator 4GP in the retaining frame 80. Accordingly, it is possible to suppress the vapor of the refrigerant W vaporized from the refrigerant retaining section 71 from affecting light emitted from the light modulator 4GP to the light combination optical system 5. Consequently, it is possible to suppress noise from occurring in an image projected from the projector 1.

According to this embodiment, a plurality of refrigerant retaining sections 71 are respectively provided in the plurality of light modulating units 4R, 4G, and 4B. The coupling sections 73a and 73b that couple the plurality of refrigerant retaining sections 71 to one another are provided. Accordingly, by coupling the refrigerant sender 50 to one refrigerant retaining section 71, it is possible to transfer the refrigerant W to the other refrigerant retaining sections 71 as well. Consequently, it is possible to simplify routing of the refrigerant sender 50 on the inside of the projector 1.

According to this embodiment, the covering sections 74 that respectively cover the coupling sections 73a and 73b are provided in the coupling sections 73a and 73b. Accordingly, it is possible to suppress the refrigerant W moving along the coupling sections 73a and 73b from vaporizing in the coupling sections 73a and 73b. Consequently, it is possible to suppress the refrigerant W from vaporizing without contributing to the cooling of the light modulating units 4R, 4G, and 4B, which are the cooling targets. It is possible to suppress the generated refrigerant W from being wasted.

In this embodiment, the coupling section 54 may be covered like the coupling sections 73a and 73b. With this configuration, it is possible to suppress the refrigerant W from vaporizing while being transferred to the cooling targets. Accordingly, it is possible to efficiently transfer the refrigerant W to the cooling targets and suppress the generated refrigerant W from being wasted. The peripheries of the coupling section 54 and the coupling sections 73a and 73b may be covered by, for example, tubes. Coating for suppressing vaporization may be applied to the surfaces of the coupling section 54 and the coupling sections 73a and 73b.

In this embodiment, configurations explained below can also be adopted. In the following explanation, explanation of the same components as the components explained above is sometimes omitted by, for example, adding the same reference numerals and signs to the components as appropriate.

Figure 12:
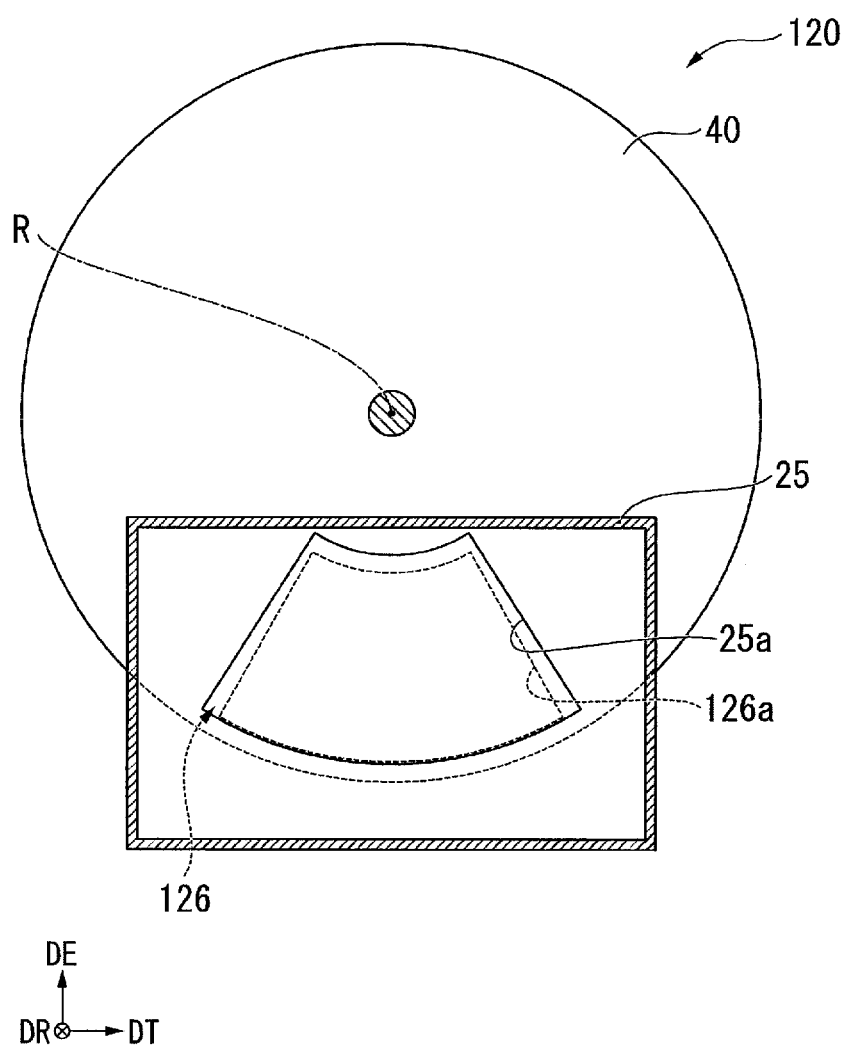
FIG. 12 is a sectional view showing a part of a refrigerant generator in a modification of the embodiment.

The configuration of the refrigerant generator is not limited to the configuration in the embodiment explained above. The refrigerant generator may have the configuration of a refrigerant generator 120 shown in FIG. 12. FIG. 12 is a sectional view showing a part of the refrigerant generator 120 in a modification of this embodiment. As shown in FIG. 12, an opening area of a second opening 126a of a second circulation duct 126 in the refrigerant generator 120 is smaller than an opening area of the first opening 25a. When viewed along the rotation axis direction DR, which is the predetermined direction, the second opening 126a has a fan shape centering on the rotation axis R of the moisture absorbing and releasing member 40 as in the embodiment explained above.

When viewed along the rotation axis direction DR, a part of the inner edge of the second opening 126a overlaps a part of the inner edge of the first opening 25a. In FIG. 12, when viewed along the rotation axis direction DR, an arc on the radial direction outer side in the inner edge of the second opening 126a having the fan shape overlaps an arc on the radial direction outer side in the inner edge of the first opening 25a having the fan shape. When viewed along the rotation axis direction DR, the other portion of the inner edge of the second opening 126a is disposed to be separated further to the inner side than the inner edge of the first opening 25a. The other components of the refrigerant generator 120 are the same as the components of the refrigerant generator 20 in the embodiment explained above.

With the configuration shown in FIG. 12, when viewed along the rotation axis direction DR, which is the predetermined direction, a part of the inner edge of the second opening 126a overlaps a part of the inner edge of the first opening 25a. Accordingly, the area of the portion of the first opening 25a overlapping the second opening 126a in the rotation axis direction DR can be increased. Consequently, it is possible to allow the air AR2 discharged to the moisture absorbing and releasing member 40 from the first opening 25a to easily flow into the second opening 126a. It is possible to improve refrigerant generation efficiency of the refrigerant generator 120.

The shape of the first opening and the shape of the second opening are not particularly limited. The shape of the first opening and the shape of the second opening may be a fan shape surrounded by two radiuses of a circle centering on the rotation axis of the moisture absorbing and releasing member and an arc present between the two radiuses or may be a circular shape. The shape of the first opening and the shape of the second opening may be shapes different from each other.

The first opening may be a portion opened at an entire end portion on a side opposed to the moisture absorbing and releasing member in the first circulation duct. In this case, the shape of the first opening is the same as the sectional shape of the first circulation duct. In this case, the first circulation duct does not include the wall portion in which the first opening is provided. The second opening may be a portion opened at an entire end portion on a side opposed to the moisture absorbing and releasing member in the second circulation duct. In this case, the shape of the second opening is the same as the sectional shape of the second circulation duct. In this case, the second circulation duct does not include the wall portion in which the second opening is provided.

The predetermined direction in which the first opening and the second opening sandwich the moisture absorbing and releasing member may not be the axial direction of the rotation axis of the moisture absorbing and releasing member. The predetermined direction in which the first opening and the second opening sandwich the moisture absorbing and releasing member may a direction orthogonal to the axial direction of the rotation axis of the moisture absorbing and releasing member. A part of the first opening and a part of the second opening may not be opposed to the moisture absorbing and releasing member.

The heater is not limited to the configuration in the embodiment explained above. The heat sink of the heater may be heated by exhaust from the light source device. The heater may be configured to come into contact with the moisture absorbing and releasing member and heat the moisture absorbing and releasing member. In this case, the heater may not heat the air before passing through the moisture absorbing and releasing member.

The refrigerant generated by the refrigerant generator is not particularly limited if the refrigerant can cool the cooling targets. The refrigerant may be other than water. The heat exchanger is not particularly limited if the heat exchanger can generate, by being cooled, the refrigerant from the air flowing into the heat exchanger. The heat exchanger may be cooled by a device other than the first blower. The driving section that rotates the moisture absorbing and releasing member is not limited to the motor and is not particularly limited. The driving section that rotates the moisture absorbing and releasing member may be a blower that sends air to the moisture absorbing and releasing member. In this case, for example, a vane that rotates with wind power is provided in the moisture absorbing and releasing member. The moisture absorbing and releasing member obtains wind power from the blower functioning as the driving section to rotate. The blower functioning as the driving section may be, for example, the first blower 60 in the embodiment explained above.

The configuration of the refrigerant sender is not limited to the configuration in the embodiment explained above. The refrigerant sender is not particularly limited if the refrigerant sender can transfer the refrigerant to the cooling targets. The refrigerant sender may include a pump that transfers the refrigerant and a pipe through which the refrigerant transferred by the pump passes. The refrigerant sender may transfer the refrigerant to the cooling targets using, for example, the gravity.

The configuration of the cooling facilitating section is not limited to the configuration in the embodiment explained above. The cooling facilitating section is not particularly limited if the cooling facilitating section can facilitate the cooling of the cooling targets by the refrigerant transferred to the cooling targets. For example, the refrigerant retaining section of the cooling facilitating section may be fine unevenness formed by machining or the like on the surfaces of the cooling targets. In this case, the refrigerant is retained by the unevenness. The refrigerant retaining section may be a hydrophilic coat or the like provided on the surfaces of the cooling targets.

In the embodiment explained above, the cooling targets are the light modulating units. However, the cooling targets are not limited to the light modulating units. The cooling targets may include at least one of the light modulators, the light modulating units, the light source device, a wavelength conversion element that converts the wavelength of light emitted from the light source device, a diffusing element that diffuses the light emitted from the light source device, and a polarization converting element that converts a polarizing direction of the light emitted from the light source device. With this configuration, the sections of the projector can be cooled in the same manner as explained above.

In the embodiment, an example is explained in which the present disclosure is applied to a projector of a transmission type. However, the present disclosure can also be applied to a projector of a reflection type. The "transmission type" means that a light modulator including a liquid crystal panel is a type for transmitting light. The "reflection type" means that the light modulator is a type for reflecting light. The light modulator is not limited to the liquid crystal panel and the like and may be a light modulator including, for example, a micromirror.

In the embodiment, an example of a projector including three light modulators is explained. However, the present disclosure can also be applied to a projector including only one light modulator and a projector including four or more light modulators.

The configurations explained above can be combined as appropriate within a range in which the configurations are not contradictory to one another.

What is claimed is:

1. A projector including a cooling target, the projector comprising:
   a light source configured to emit light;
   a light modulator configured to modulate, according to an image signal, the light emitted from the light source;
   a projection optical device configured to project the light modulated by the light modulator; and
   a cooler configured to cool the cooling target based on transformation of a refrigerant into gas, wherein:
   the cooler includes:
     a refrigerant generator configured to generate the refrigerant; and
     a refrigerant sender configured to transfer the generated refrigerant to the cooling target,
   the refrigerant generator includes:
     a rotating moisture absorbing and releasing member;
     a first blower configured to send air to a portion of the moisture absorbing and releasing member located in a first region;
     a heat exchanger coupled to the refrigerant sender;
     a heater configured to heat a portion of the moisture absorbing and releasing member located in a second region different from the first region;
     a circulation path passing the portion of the moisture absorbing and releasing member located in the second region and the heat exchanger;
     a second blower configured to circulate the air in the circulation path and send the air around the portion of the moisture absorbing and releasing member heated by the heater to an inside of the heat exchanger;
     a first circulation duct through which the air sent to the moisture absorbing and releasing member from the inside of the heat exchanger by the second blower passes; and
     a second circulation duct through which the air sent to the inside of the heat exchanger from the moisture absorbing and releasing member by the second blower passes,
   the heat exchanger is cooled to generate the refrigerant from the air flowing into the heat exchanger,
   the first circulation duct includes a first opening opposed to the portion of the moisture absorbing and releasing member located in the second region,
   the second circulation duct includes a second opening opposed to the portion of the moisture absorbing and releasing member located in the second region, the second opening being disposed in a position where the second opening and the first opening sandwich the moisture absorbing and releasing member in a predetermined direction,
   an opening area of the second opening is smaller than an opening area of the first opening, and
   when viewed along the predetermined direction, the entire second opening overlaps the first opening.

2. The projector according to claim 1, wherein, when viewed along the predetermined direction, the entire second opening is disposed to be separated further to an inner side than an inner edge of the first opening.

3. The projector according to claim 1, wherein, when viewed along the predetermined direction, a part of an inner edge of the second opening overlaps a part of an inner edge of the first opening.

4. The projector according to claim 1, wherein
the second circulation duct includes a wall portion opposed to the moisture absorbing and releasing member,
the second opening is a through-hole provided in the wall portion, and
when viewed along the predetermined direction, at least a part of a peripheral edge portion of the second opening in the wall portion overlaps the first opening.

5. The projector according to claim 1, wherein the predetermined direction is substantially parallel to an axial direction of a rotation axis of the moisture absorbing and releasing member.

6. The projector according to claim 5, wherein, when viewed along the predetermined direction, the first opening and the second opening have fan shapes centering on the rotation axis of the moisture absorbing and releasing member.

7. The projector according to claim 1, wherein, when viewed along the predetermined direction, the entire first opening and the entire second opening overlap the moisture absorbing and releasing member.

8. The projector according to claim 1, wherein the heater includes:
a heat sink disposed on an inside of the first circulation duct;
a heater body configured to heat the heat sink; and
the second blower.

9. The projector according to claim 1, wherein the cooling target is the light modulator.

* * * * *